United States Patent
Lee et al.

(10) Patent No.: US 10,954,321 B2
(45) Date of Patent: *Mar. 23, 2021

(54) HIGH-DENSITY ETHYLENE-BASED POLYMER USING SUPPORTED HYBRID METALLOCENE CATALYST, AND MANUFACTURING METHOD THEREFOR

(71) Applicant: HANWHA CHEMICAL CORPORATION, Seoul (KR)

(72) Inventors: In Jun Lee, Suwon-si (KR); Won Jun Kang, Changwon-si (KR); Dong Ok Kim, Seoul (KR); Song Hee Yang, Incheon (KR); Sung Woo Lee, Daejeon (KR); Dong Wook Jeong, Daejeon (KR); Ui Gab Joung, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 123 days.

This patent is subject to a terminal disclaimer.

(21) Appl. No.: 16/306,239

(22) PCT Filed: Feb. 10, 2017

(86) PCT No.: PCT/KR2017/001505
§ 371 (c)(1),
(2) Date: Dec. 11, 2018

(87) PCT Pub. No.: WO2017/209372
PCT Pub. Date: Dec. 7, 2017

(65) Prior Publication Data
US 2019/0169325 A1 Jun. 6, 2019

(30) Foreign Application Priority Data
Jun. 3, 2016 (KR) .................. 10-2016-0069768

(51) Int. Cl.
| | | |
|---|---|---|
| C08F 210/16 | (2006.01) |
| C08F 4/6592 | (2006.01) |
| C08L 23/08 | (2006.01) |
| C08F 10/02 | (2006.01) |
| C08F 4/642 | (2006.01) |
| B01J 31/22 | (2006.01) |
| C08F 2/34 | (2006.01) |
| C08F 4/659 | (2006.01) |

(52) U.S. Cl.
CPC ........... *C08F 10/02* (2013.01); *B01J 31/2295* (2013.01); *C08F 4/642* (2013.01); *C08F 4/6592* (2013.01); *C08F 210/16* (2013.01); *C08L 23/0815* (2013.01); *B01J 2531/46* (2013.01); *B01J 2531/48* (2013.01); *B01J 2531/49* (2013.01); *C08F 2/34* (2013.01); *C08F 4/65912* (2013.01); *C08F 4/65916* (2013.01); *C08F 2500/07* (2013.01)

(58) Field of Classification Search
CPC .. C08L 23/0815; C08F 210/16; C08F 4/65904; C08F 4/65925; C08F 4/65927
See application file for complete search history.

(56) References Cited

U.S. PATENT DOCUMENTS

| | | | |
|---|---|---|---|
| 7,294,600 B2 | 11/2007 | Lee et al. | |
| 2006/0235171 A1 | 10/2006 | Lee et al. | |
| 2010/0121006 A1 | 5/2010 | Cho et al. | |
| 2018/0134828 A1* | 5/2018 | Doufas | ................ C08F 210/16 |

FOREIGN PATENT DOCUMENTS

| | | |
|---|---|---|
| CN | 1697843 A | 11/2005 |
| CN | 101679540 B | 9/2012 |
| EP | 3428201 A1 | 1/2019 |
| EP | 3450469 A1 | 3/2019 |
| JP | 2007-177168 A | 7/2007 |
| JP | 2007-197722 A | 8/2007 |
| JP | 2011-117006 A | 6/2011 |
| KR | 10-2008-0104331 A | 12/2008 |
| KR | 10-2014-0041162 A | 4/2014 |

OTHER PUBLICATIONS

International Search Report for PCT/KR2017/001505 dated May 22, 2017 [PCT/ISA/210].
Extended European Search Report dated Jan. 23, 2020 in European Application No. 17806865.6.

\* cited by examiner

*Primary Examiner* — Caixia Lu
(74) *Attorney, Agent, or Firm* — Sughrue Mion, PLLC

(57) ABSTRACT

A high-density ethylene-based polymer is provided. The high-density ethylene-based polymer contains an ethylene homopolymer or a copolymer of ethylene and at least one comonomer selected from the group consisting of an α-olefin, a cyclic olefin, and a straight, branched and cyclic diene. The high-density polyethylene resin has a wide molecular weight distribution and excellent comonomer distribution characteristics, has excellent melt flowability due to a long chain branched structure, and has excellent mechanical characteristics since the comonomer distribution is concentrated in a high-molecular-weight body. The high-density ethylene polymer has excellent molding processability during processing such as extrusion, compression, injection and rotational molding by having excellent mechanical characteristics and melt flowability.

18 Claims, 6 Drawing Sheets

HIGH-DENSITY ETHYLENE-BASED POLYMER USING SUPPORTED HYBRID METALLOCENE CATALYST, AND MANUFACTURING METHOD THEREFOR

CROSS REFERENCE TO RELATED APPLICATIONS

This application is a National Stage of International Application No. PCT/KR2017/001505 filed Feb. 10, 2017, claiming priority based on Korean Patent Application No. 10-2016-0069768 filed Jun. 3, 2016, the entire disclosures of which are incorporated herein by reference.

TECHNICAL FIELD

The present invention relates to a high-density ethylene-based polymer using a supported hybrid metallocene catalyst and a manufacturing method therefor, and more particularly, to a high-density polyethylene polymer which includes a high molecular weight, exhibits excellent mechanical properties and chemical resistance since a content of a comonomer is relatively concentrated in a high-molecular-weight body, and has excellent high melt flowability due to a wide molecular weight distribution and a long chain branched structure.

BACKGROUND ART

The mechanical and thermal characteristics of polyethylene resins are affected by molecular weight and density, and the application fields are changed accordingly. Generally, as the density of the polyethylene polymer is lower, the transparency and impact strength thereof become better, but the polyethylene polymer has a disadvantage that physical properties such as heat resistance, hardness, and flexural modulus are deteriorated and the chemical resistance is also deteriorated.

On the other hand, as the density of the polyethylene polymer is higher, the physical properties such as heat resistance, hardness, and flexural modulus become better, and the chemical resistance increases, but the transparency and impact strength thereof are deteriorated. Therefore, when producing injection products using an ethylene copolymer, especially various industrial products such as cartridges and pail containers, it is very difficult to produce injection products having excellent impact strength and excellent chemical resistance. In particular, since injection products such as various industrial products required in the market require high impact resistance, the necessity of such technology is very high.

High-density polyethylene polymers are available for many applications through various molding methods. For example, as a typical method for a film molded product, there is an inflation method in which a molten polymer extrudate is inflated by melting a high-density polyethylene polymer and extruding a high-density polyethylene polymer from a mold while blowing air thereinto. In addition, as a method for obtaining a molded product having a desired shape, there is a blow molding method in which a molten high-density polyethylene polymer is blown into a cavity of a die and air is blown into a molten resin in the cavity of the die so as to expand and press the molten resin on a cavity inner wall to thereby form a molten polymer in the cavity. There is also an injection molding method in which a molten high-density polyethylene polymer is pressed in a cavity of a die so as to fill the cavity.

As described above, the high-density polyethylene polymer may be manufactured by various molding methods, but these methods are common in that the high-density polyethylene polymer is first heated to a molten state and then molded. Therefore, the behavior of the high-density polyethylene polymer at the time of heating and melting, that is, the melting property, is an extremely important physical property in the molding of the high-density polyethylene polymer.

In particular, in the molding such as extrusion molding, compression molding, injection molding, or rotational molding, the melting property, especially the melt flowability of the high-density polyethylene-based polymer, is an essential property that affects satisfactory moldability. The molding processability used herein is not limited to the processability at the time of extrusion molding, compression molding, injection molding, or rotational molding.

Generally, it can be said that melt flowability is more excellent as an MI, an MFI, or an MFR is larger. Practically, however, since properties required for polymers as molding materials are different for each molding method, the index used as the standard indicating molding processability is changed according to the molding method. For example, in the injection molding method, a high-density polyethylene polymer having a narrow molecular weight distribution tends to be used so as to obtain a molded product having impact resistance.

The high-density polyethylene polymer conventionally used for extrusion molding, compression molding, injection molding, or rotational molding is generally manufactured by using a titanium-based Ziegler-Natta catalyst or a chromium-based catalyst.

The high-density polyethylene polymer manufactured by using such a catalyst can improve melt flowability due to a wide molecular weight distribution, but has a drawback in which mechanical properties such as impact resistance are significantly deteriorated due to mixing of low-molecular-weight components, and chemical resistance is deteriorated since a comonomer is intensively distributed in a low-molecular-weight body. Therefore, there has been a problem that it is impossible to increase a speed in injection molding while maintaining excellent mechanical properties.

To solve these problems, many studies on metallocene catalysts have been conducted. U.S. Pat. No. 6,525,150 discloses a metallocene catalyst capable of producing a resin having a narrow molecular weight distribution, and in the case of a copolymer, a uniform comonomer distribution by using uniform active sites of metallocene. However, since the molecular weight distribution is narrow, the mechanical strength is excellent, but the molding processability is low.

As described above, in the case of a single metallocene catalyst, since a molecular weight distribution is narrow due to uniform active sites, molding processability is not satisfactory. Therefore, the application development of metallocene catalyst systems has not been much conducted in the field of high-density polyethylene polymers in which the balance between mechanical properties and moldability is important.

In order to solve these problems, many proposals have been made to widen a molecular weight distribution by using a plurality of reactors or by mixing many kinds of metallocene catalysts.

However, when the method for widening the molecular weight distribution is used, moldability is improved, but other physical properties are inevitably deteriorated. Thus, it is impossible to obtain a high-density polyethylene polymer having excellent physical properties, such as mechanical strength, which can be obtained by narrowing the molecular weight distribution.

In addition, a method for improving a melt tension by maintaining an intrinsic viscosity of a catalyst has been proposed, but this method cannot improve the deterioration of melt flowability and thus high-speed molding is difficult.

In order to solve the problem of the metallocene catalyst, the melt flowability of the polymer is improved by using a catalyst in which a long chain branch (LCB) is introduced into a main chain of the polymer as a side branch, but there is a problem that mechanical properties such as impact resistance are significantly lower than those of the case of using a general metallocene catalyst.

In addition, as another method, a method for manufacturing polyolefin having a bimodal molecular weight distribution by using catalysts having different reactivity to a comonomer is proposed. However, the polyolefin having the bimodal molecular weight distribution, which is manufactured in the above-described manner, has improved melt flowability, but has different molecular weight distributions and thus low kneading properties. Therefore, there is a problem that it is difficult to obtain a product having uniform physical properties after processing, and mechanical strength is deteriorated.

Many methods have been proposed so as to improve the mechanical properties and melt flowability of high-density polyethylene polymers manufactured using metallocene catalysts, but most methods propose only the solution to linear low-density polyolefins. In addition, since metallocene has characteristics that the activity tends to decrease as the concentration of the comonomer decreases, the activity in the manufacture of the high-density polyolefin is low and thus it is not cost-effective.

Even in the case of the catalyst having excellent activity and processability in manufacture of the low-density polyolefin, the activity in the manufacture of the high-density polyolefin is low and thus it is not cost-effective. In particular, in a gas phase process, a lot of fine particles are formed and stable work is difficult.

In a gas phase reactor, activity is an important factor. Due to the low activity, a large amount of fine particles are formed, causing a large amount of static electricity. The static electricity is attached to the wall surface of the reactor to obstruct a heat transfer and lower a polymerization temperature. In addition, since the fine particles attached to the wall surface of the reactor continue to grow, the production is stopped.

A catalyst for solving the above-described problems and manufacturing a high-density polyolefin polymer having excellent mechanical strength, excellent melt flowability, and high activity is continuously required, and the improvement thereof is required.

DESCRIPTION OF EMBODIMENTS

Technical Problem

The present invention has been made in an effort to solve the above-described problems.

The present invention provides a high-density ethylene-based polymer, which simultaneously satisfies mechanical properties, chemical resistance, and excellent molding processability that a conventional high-density ethylene-based polymer has not exhibited, and a manufacturing method therefor.

Another object of the present invention is to provide a high-density polyethylene polymer, which has a unimodal molecular weight distribution that is excellent in impact strength, flexural strength, environmental stress cracking resistance (ESCR), and melt tension since a content of a comonomer is high in a high-molecular-weight body manufactured in the presence of a supported hybrid metallocene catalyst described below and the content of the comonomer is low in a low-molecular-weight body, and a manufacturing method therefor.

Another object of the present invention is to provide a high-density polyethylene polymer, which has a wide molecular weight distribution and a long chain branched structure and thus has excellent productivity due to a small load during processing such as extrusion molding, compression molding, injection molding, or rotational molding, and a manufacturing method therefor.

Solution to Problem

In order to achieve the above-described objects of the present invention and achieve the characteristic effects of the present invention described below, the characteristic construction of the present invention is as follows.

According to one aspect of the present invention, there is provided an ethylene-based polymer in which strain hardening is 2.5 or more at an extensional rate of 0.5 (1/s), a density is 0.930 g/cm³ to 0.970 g/cm³, an MI is 0.1 g/10 min to 50 g/10 min, and an MFR is 35 to 100.

The present invention provides an ethylene-based polymer manufactured under existence of a supported hybrid catalyst including at least one first metallocene compound represented by Formula 1, at least one second metallocene compound represented by Formula 2, and at least one cocatalyst compound:

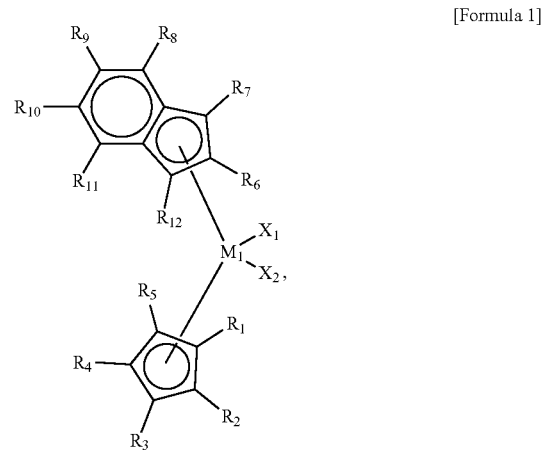

[Formula 1]

wherein, in Formula 1, M1 is a group 4 transition metal of the periodic table of the elements, $X_1$ and $X_2$ are each independently one of halogen atoms, $R_1$ to $R_{12}$ are each independently a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and are linked to each other to form a ring, cyclopentadiene linked to $R_1$ to $R_5$ and indene linked to $R_6$ to $R_{12}$ have an asymmetric structure having different structures, and the cyclopentadiene and the indene are not linked to each other to form a non-bridge structure:

[Formula 2]

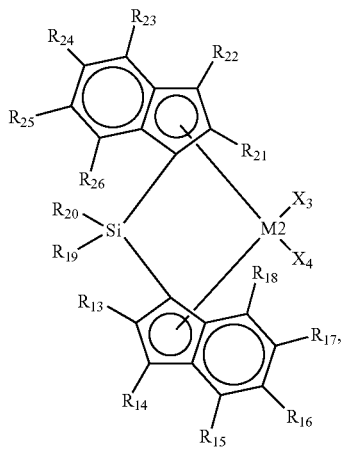

wherein, in Formula 2, M2 is a group 4 transition metal of the periodic table of the elements, $X_3$ and $X_4$ are each independently one of halogen atoms, $R_{13}$ to $R_{18}$ are each independently a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and are linked to each other to form a ring, $R_{21}$ to $R_{26}$ are each independently a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and are linked to each other to form a ring, $R_{19}$ and $R_{20}$ are each independently a substituted or unsubstituted $C_1$-$C_{20}$ alkyl group and are linked to each other to form a ring, indene linked to $R_{13}$ to $R_{18}$ and indene linked to $R_{21}$ to $R_{26}$ have the same structure or different structures, and the indene linked to $R_{13}$ to $R_{18}$ and the indene linked to $R_{21}$ to $R_{26}$ are linked to Si to form a bridge structure.

Advantageous Effects of Disclosure

A high-density ethylene-based polymer, which is manufactured under existence of a supported hybrid metallocene catalyst, has excellent melt flowability and has excellent characteristics in impact strength, flexural strength, environmental stress cracking resistance, and melt tension.

BEST MODE

Figure 1:
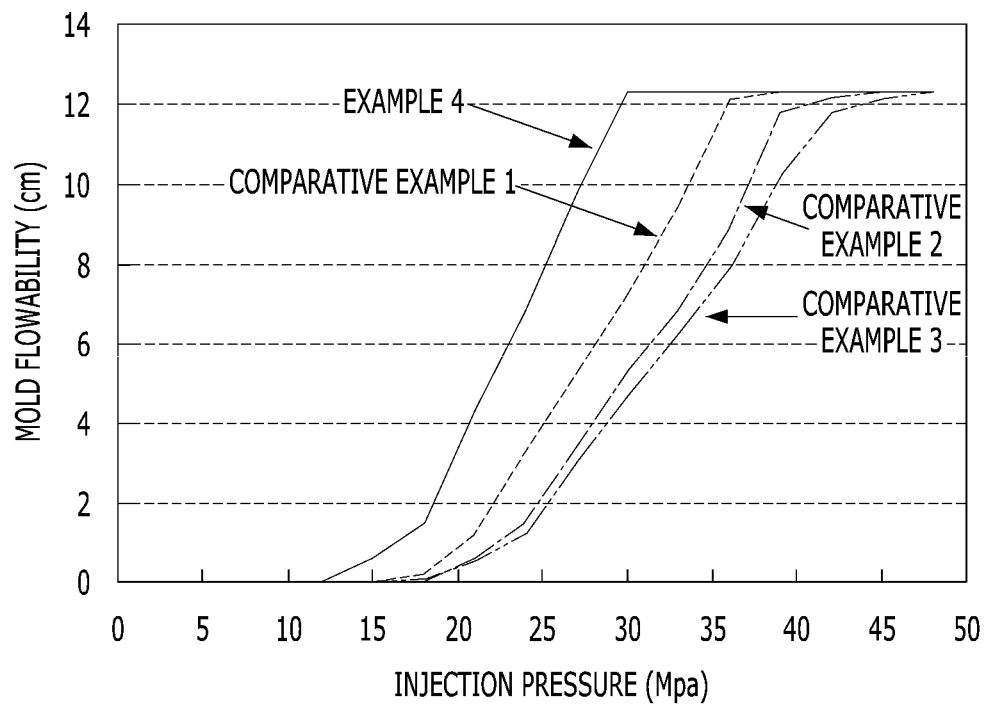
FIG. 1 shows comparison of injection moldability between a copolymer manufactured in Example 4 and commercial products manufactured in Comparative Examples 1 to 3 according to a pressure.

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment.

Therefore, the following detailed description is not to be taken in a limiting sense, and the scope of the present invention is to be limited only by the appended claims and the entire scope of equivalents thereof, if properly explained.

Also, it will be understood that although the terms "first", "second", etc. may be used herein to describe various components, these components should not be limited by these terms. These components are only used to distinguish one component from another.

Hereinafter, embodiments of the present invention will be described with reference to the accompanying drawings, so that those of ordinary skill in the art can easily carry out the present invention.

The present invention includes a high-density ethylene-based polymer which is polymerized under existence of a supported hybrid metallocene catalyst.

The polymer is a concept which includes a copolymer.

Supported hybrid metallocene catalysts used herein each independently include at least one first metallocene compound, at least one second metallocene compound, and at least one cocatalyst compound.

The first metallocene compound, which is a transition metal compound according to the present invention, may be represented by Formula 1 below.

The first metallocene compound serves to exhibit high activity at the supported hybrid catalyst, and serves to improve a melt flowability of a manufactured polymer.

The first metallocene compound has a low mixing rate of a comonomer and has characteristics of forming a low-molecular-weight body, thereby improving processability in processing the polymer.

In addition, high density is formed due to low mixing of a comonomer, and high activity is exhibited even in high-density production.

Since the first metallocene compound has an asymmetric structure and a non-bridge structure having different ligands, the first metallocene compound forms a steric hindrance in which a comonomer hardly approaches a catalystic active site. Therefore, the first metallocene serves to reduce the mixing of the comonomer and exhibits both processability and high catalytic activity in the manufacture of the supported hybrid metallocene.

[Formula 1]

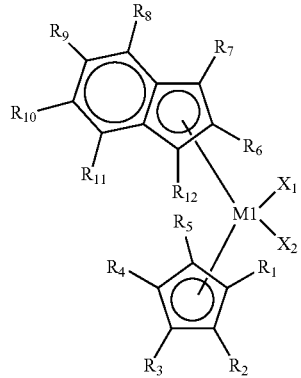

In Formula 1, $M_1$ may be a group 4 transition metal of the periodic table of the elements, $X_1$ and $X_2$ may each independently be one of halogen atoms, $R_1$ to $R_{12}$ may each independently be a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and may be linked to each other to form a ring, cyclopentadiene linked to $R_1$ to $R_5$ and indene linked to $R_6$ to $R_{12}$ may have an asymmetric structure having different structures, and the cyclopentadiene and the indene may form a non-bridge structure since the cyclopentadiene and the indene are not linked to each other.

In the present invention, ions or molecules coordinating with the transition metal ($M_1$ and $M_2$ in Formulae 1 and 2), such as cyclopendadiene linked to $R_1$ to $R_5$ and indene linked to $R_6$ to $R_{12}$ in Formula 1, and indene linked to $R_{13}$ to $R_{18}$ and indene linked to $R_{21}$ to $R_{26}$ are referred to as ligands.

In the present invention, the term "substituted" means that a hydrogen atom is substituted with a substituent such as a halogen atom, a $C_1$-$C_{20}$ hydrocarbon group, a $C_1$-$C_{20}$ alkoxy group, and a $C_6$-$C_{20}$ aryloxy group, unless otherwise specified.

In addition, the term "hydrocarbon group" means a linear, branched, or cyclic saturated or unsaturated hydrocarbon group, unless otherwise specified, and the alkyl group, the alkenyl group, the alkynyl group, and the like may be linear, branched, or cyclic.

In a specific example, examples of the transition metal compound represented by Formula 1 include transition metal compounds having the following structures and mixtures thereof, but the present invention is not limited thereto.

[Formula 1-1]

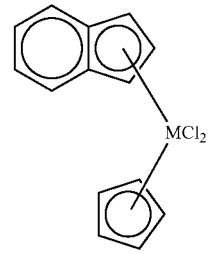

[Formula 1-2]

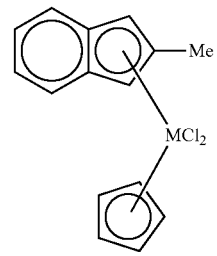

[Formula 1-3]

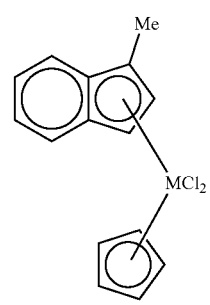

-continued
[Formula 1-4]
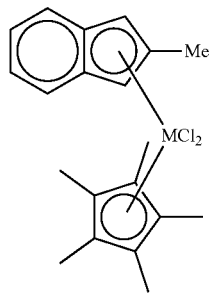
[Formula 1-5]
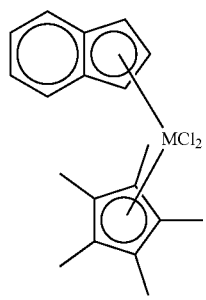
[Formula 1-6]
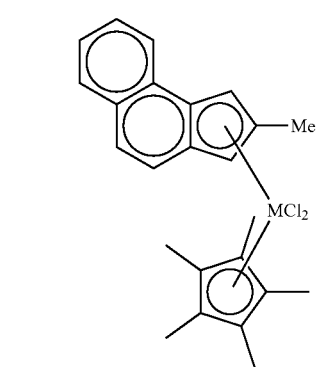
[Formula 1-7]
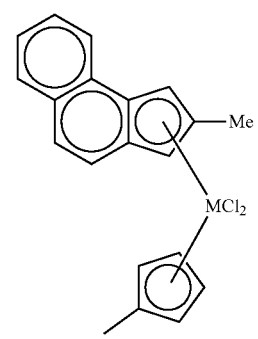
[Formula 1-8]
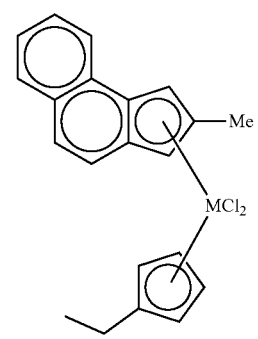
-continued
[Formula 1-9]
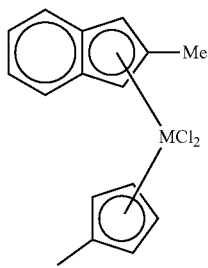
[Formula 1-10]
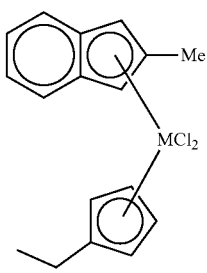
[Formula 1-11]
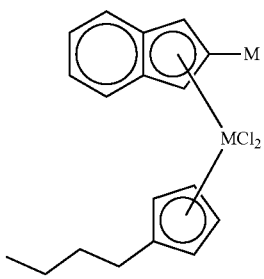
[Formula 1-12]
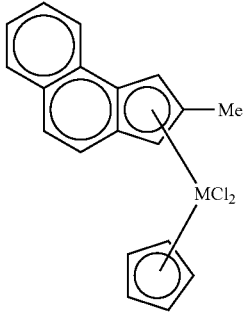
[Formula 1-13]
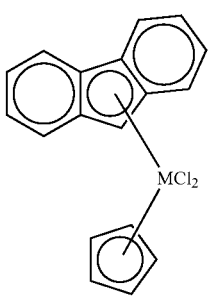

[Formula 1-14]

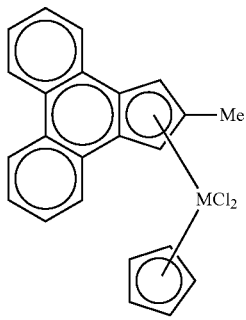

[Formula 1-15]

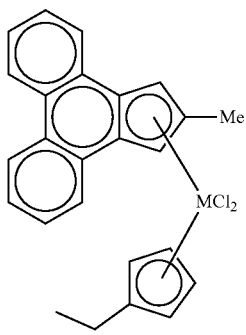

[Formula 1-16]

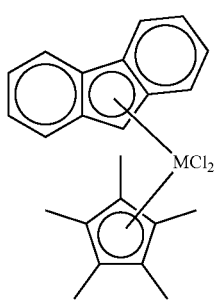

[Formula 1-17]

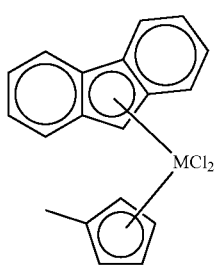

[Formula 1-18]

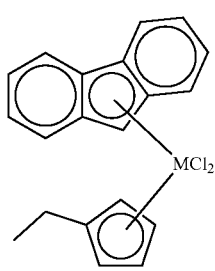

[Formula 1-19]

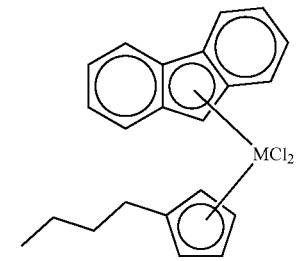

In the transition metal compounds, M is a group 4 transition metal of the periodic table of the elements, such as hafnium (Hf), zirconium (Zr), or titanium (Ti), and Me is a methyl group.

The second metallocene compound, which is a transition metal compound according to the present invention, may be represented by Formula 2 below.

The second metallocene compound serves to exhibit a high mixing rate of a comonomer at the supported hybrid catalyst, and serves to improve mechanical properties of the manufactured polymer.

The second metallocene compound has a high mixing rate of a comonomer and has characteristics of forming a high-molecular-weight body and concentrating the distribution of a comonomer on the high-molecular-weight body, thereby improving impact strength, flexural strength, environmental stress cracking resistance, and melt tension. In addition, the second metallocene compound forms a long chain branched structure to improve the melt flowability of the high-density polyethylene resin having a high molecular weight.

Since the second metallocene compound has a symmetric or asymmetric structure and a bridge structure having various ligands, the second metallocene compound forms a steric hindrance such that the comonomer easily approaches a catalytic active site. Therefore, the second metallocene serves to increase the mixing of the comonomer.

[Formula 2]

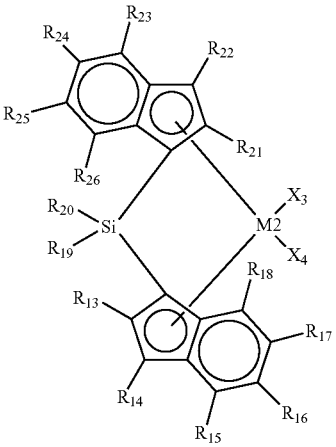

In Formula 2, M2 may be a group 4 transition metal of the periodic table of the elements, $X_3$ and $X_4$ may each independently be one of halogen atoms, $R_{13}$ to $R_{18}$ may each independently be a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group and may be linked to each other to form a ring, $R_{21}$ to $R_{26}$ may each independently be a hydrogen atom, a substituted or unsubstituted $C_1$-$C_{10}$ alkyl group, a substituted or unsubstituted $C_6$-$C_{20}$ aryl group, or a substituted or unsubstituted $C_7$-$C_{40}$ alkylaryl group and may be linked to each other to form a ring, $R_{19}$ and $R_{20}$ may each independently be a substituted or unsubstituted $C_1$-$C_{20}$ alkyl group and may be linked to each other to form a ring, indene linked to $R_{13}$ to $R_{18}$ and indene linked to $R_{21}$ to $R_{26}$ may have the same structure or different structures, and indene linked to $R_{13}$ to $R_{18}$ and indene linked to $R_{21}$ to $R_{26}$ may be linked to Si to form a bridge structure.

In the present invention, the term "substituted" means that a hydrogen atom is substituted with a substituent such as a halogen atom, a $C_1$-$C_{20}$ hydrocarbon group, a $C_1$-$C_{20}$ alkoxy group, and a $C_6$-$C_{20}$ aryloxy group, unless otherwise specified. In addition, the term "hydrocarbon group" means a linear, branched, or cyclic saturated or unsaturated hydrocarbon group, unless otherwise specified, and the alkyl group, the alkenyl group, the alkynyl group, and the like may be linear, branched, or cyclic.

In a specific example, examples of the transition metal compound represented by Formula 2 include transition metal compounds having the following structures and mixtures thereof, but the present invention is not limited thereto.

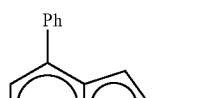

[Formula 2-1]

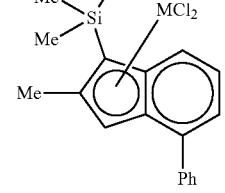

[Formula 2-2]

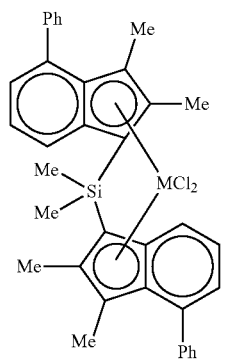

[Formula 2-3]

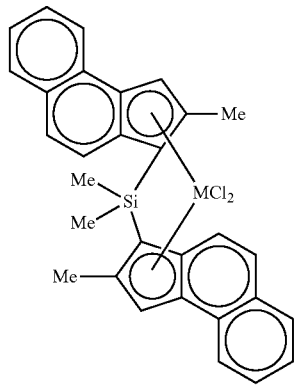

[Formula 2-4]

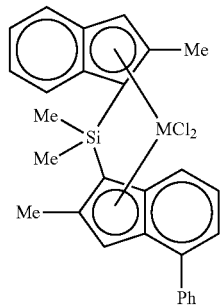

[Formula 2-5]

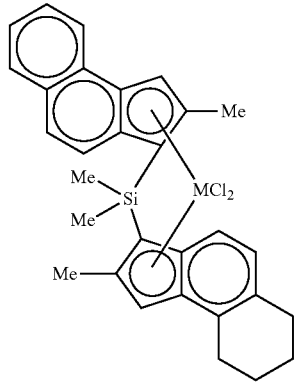

[Formula 2-6]

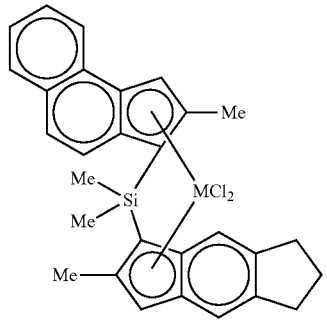

[Formula 2-7]

[Formula 2-8]
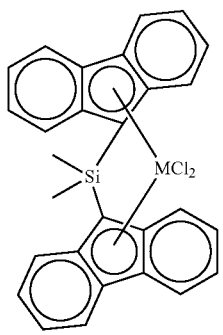
[Formula 2-9]
[Formula 2-10]
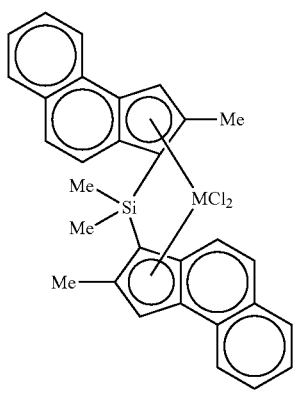
[Formula 2-11]
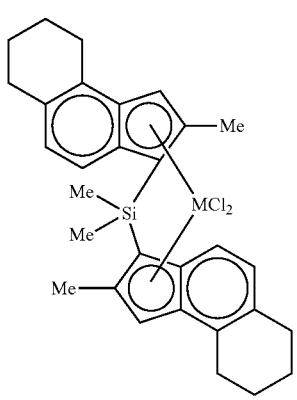
[Formula 2-12]
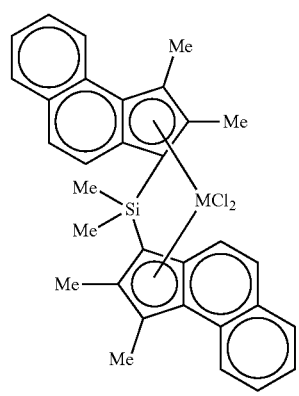
[Formula 2-13]
[Formula 2-14]
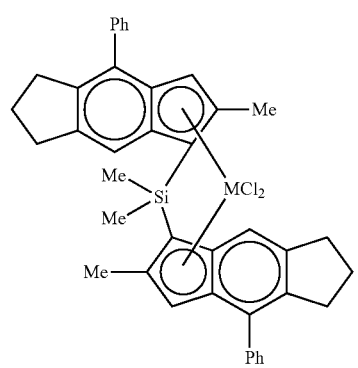
[Formula 2-15]
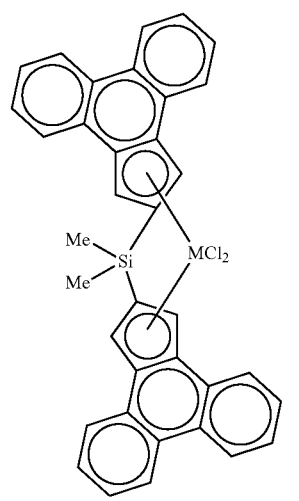

[Formula 2-16]
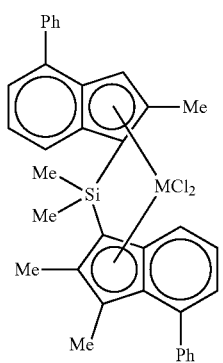
[Formula 2-17]
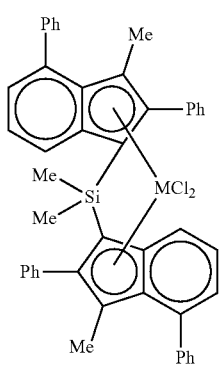
[Formula 2-18]
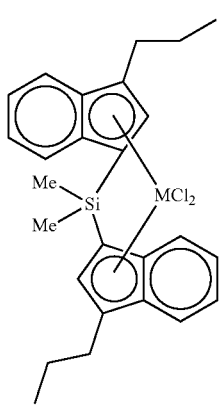
[Formula 2-19]
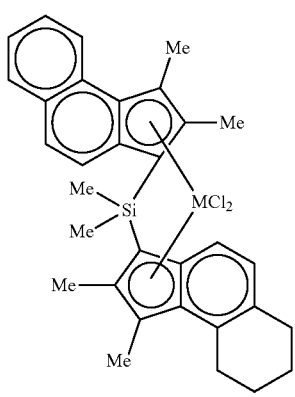
[Formula 2-20]
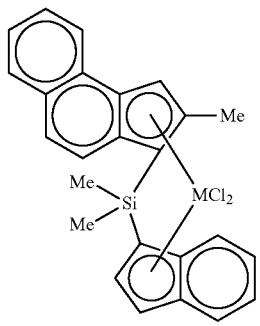
[Formula 2-21]
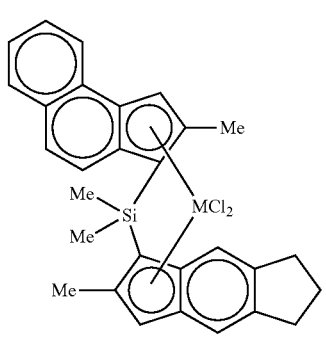
[Formula 2-22]
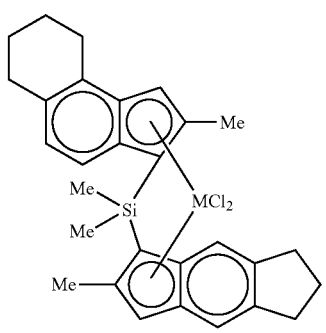
[Formula 2-23]
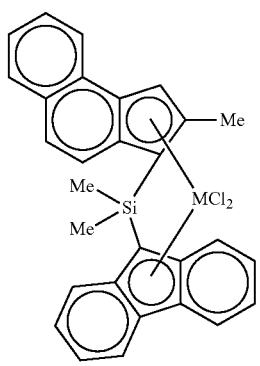

[Formula 2-24]

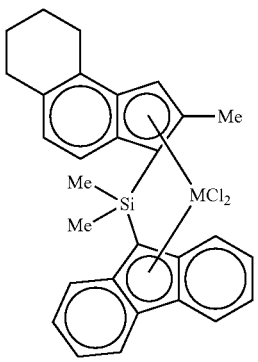

[Formula 2-25]

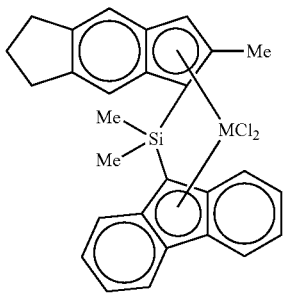

[Formula 2-26]

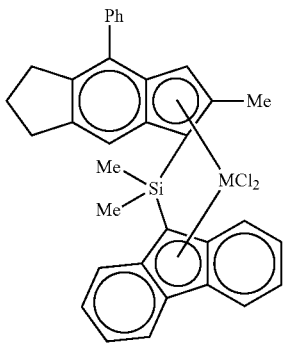

[Formula 2-27]

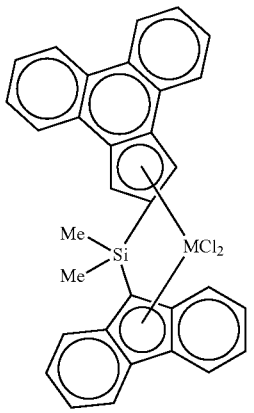

In the transition metal compounds, M is a group 4 transition metal of the periodic table of the elements, for example, hafnium (Hf), zirconium (Zr), or titanium (Ti), Me is a methyl group, and Ph is a phenyl group.

The catalyst composition according to the present invention may include a cocatalyst compound containing at least one compound selected from the group consisting of the compounds represented by Formulae 3 to 6 and the transition metal compound.

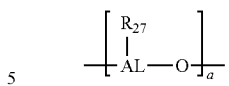

[Formula 3]

In Formula 3, AL is aluminum, $R_{27}$ is a halogen atom, a $C_1$-$C_{20}$ hydrocarbon group, or a $C_1$-$C_{20}$ hydrocarbon group substituted with halogen, and a is an integer of 2 or more.

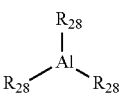

[Formula 4]

In Formula 4, AL is aluminum or boron, $R_{28}$ is a halogen atom, a $C_1$-$C_{20}$ hydrocarbon group, a $C_1$-$C_{20}$ hydrocarbon group substituted with halogen, or a $C_1$-$C_{20}$ alkoxy group.

[L1-H]$^+$[Z1(A2)$_4$]$^-$  [Formula 5]

[L2]$^+$[Z2(A3)$_4$]$^-$  [Formula 6]

In Formulae 5 and 6, L1 and L2 are neutral or cationic Lewis acids, Z1 and Z2 are group 13 elements of the periodic table of the elements, and A2 and A3 are a substituted or unsubstituted $C_6$-$C_{20}$ aryl group or a substituted or unsubstituted $C_1$-$C_{20}$ alkyl group.

The compound represented by Formula 3 is aluminoxane and is not particularly limited as long as the compound is general alkylaluminoxane. For example, methyl aluminoxane, ethyl aluminoxane, isobutyl aluminoxane, butyl aluminoxane, and the like may be used. Specifically, methylaluminoxane may be used. The alkyl aluminoxane may be manufactured by a general method, such as a method of adding an appropriate amount of water to trialkylaluminum or a method of reacting trialkylaluminum with a hydrocarbon compound or an inorganic hydrate salt including water. Generally, the alkyl aluminoxane is obtained in the form of a mixture of linear and cyclic aluminoxanes.

As the compound represented by Formula 4, for example, a general alkyl metal compound may be used. Specific examples of the compound represented by Formula 4 include trimethylaluminum, triethylaluminum, triisobutylaluminum, tripropylaluminum, tributylaluminum, dimethylchloroaluminum, triisopropylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropyl boron, tributylboron, and tripentafluorophenylboron. More specific examples of the compound represented by Formula 4 include trimethylaluminum, triisobutylaluminum, and tripentafluorophenylboron.

Examples of the compound represented by Formula 5 or 6 include methyldioctadecylammonium tetrakis(pentafluorophenyl)borate ([HNMe(C$_{18}$H$_{37}$)$_2$]+[B(C$_6$F$_5$)$_4$]−), trimethylammonium tetrakis(phenyl)borate, triethylammonium tetrakis(phenyl)borate, tripropylammonium tetrakis(phenyl)borate, tributylammonium tetrakis(phenyl)borate, trimethylammonium tetrakis(p-tolyl)borate, tripropylammonium tetrakis(p-tolyl)borate, trimethylammonium tetrakis(o, p-dimethylphenyl)borate, triethylammonium tetrakis(o,p-dimethylphenyl)borate, trimethylammonium tetrakis(p-trifluoromethylphenyl)borate, tributylammonium tetrakis(p- trifluoromethylphenyl)borate, tributylammonium tetrakis (pentafluorophenyl)borate, diethylammonium tetrakis (pentafluorophenyl)borate, triphenylphosphonium tetrakis (phenyl)borate, trimethylphosphonium tetrakis(phenyl) borate, N,N-diethylanilinium tetrakis(phenyl)borate, N,N-dimethylanilinium tetrakis(pentafluorophenyl)borate, N,N-diethylanilinium tetrakis(pentafluorophenyl)borate, triphenylcarbonium tetrakis(p-trifluoromethylphenyl)borate, triphenylcarbenium tetrakis(pentafluorophenyl)borate, trimethylammonium tetrakis(phenyl)aluminate, triethylammonium tetrakis(phenyl)aluminate, tripropylammonium tetrakis(phenyl)aluminate, tributylammonium tetrakis(phenyl) aluminate, trimethylammonium tetrakis(p-tolyl)aluminate, tripropylammonium tetrakis(p-tolyl)aluminate, triethylammonium tetrakis(o,p-dimethylphenyl)aluminate, tributylammonium tetrakis(p-trifluoromethylphenyl)aluminate, trimethylammonium tetrakis(p-trifluoromethylphenyl) aluminate, tributylammonium tetrakis(pentafluorophenyl) aluminate, N,N-diethylanilinium tetrakis(phenyl)aluminate, N,N-diethylanilinium tetrakis(phenyl)aluminate, N,N-diethylanilinium tetrakis(pentafluorophenyl) aluminate, diethylammonium tetrakis(pentafluorophenyl)aluminate, triphenylphosphonium tetrakis(phenyl)aluminate, trimethylphosphonium tetrakis(phenyl)aluminate, triethylammonium tetrakis(phenyl)aluminate, and tributylammonium tetrakis(phenyl)aluminate, but the present invention is not limited thereto. Specific examples of the compound represented by Formula 5 or 6 include methyldioctadecylammonium tetrakis(pentafluorophenyl)borate ([HNMe$(C_{18}H_{37})_2$]+[B$(C_6F_5)_4$]−), N,N-dimethylanilinium tetrakis (pentafluorophenyl)borate, and triphenylcarbenium tetrakis (pentafluorophenyl)borate may be used.

In the manufacture of the supported hybrid metallocene catalyst according to the present invention, a mass ratio of the transition metal (M1 of Formula 1 and M2 of Formula 2) to the carrier in the first and second metallocene compounds is preferably 1:1 to 1:1,000. The mass ratio may be preferably 1:100 to 1:500. When the carrier and the metallocene compound are contained at the above-described mass ratio, appropriate supported catalyst activity is exhibited, which is advantageous in maintaining the activity of the catalyst and achieving cost reduction.

In addition, a mass ratio of the cocatalyst compound represented by Formula 5 or 6 to the carrier is preferably 1:20 to 20:1, and the mass ratio of the cocatalyst compound represented by Formula 3 or 4 to the carrier is preferably 1:100 to 100:1.

The mass ratio of the first metallocene compound to the second metallocene compound is preferably 1:100 to 100:1. When the cocatalyst and the metallocene compound are contained at the above-described mass ratio, it is advantageous in maintaining the activity of the catalyst and achieving cost reduction.

As a carrier suitable for the manufacture of the supported hybrid metallocene catalyst according to the present invention, a porous material having a large surface area may be used.

The first and second metallocene compounds and the cocatalyst compound may be a supported catalyst that is hybrid-supported on the carrier and used as the catalyst. The supported catalyst means a catalyst that is well dispersed so as to improve catalyst activity and maintain stability and is supported on a carrier for stable maintenance.

The hybrid support refers to not supporting the first and second metallocene compounds on the carriers but supporting the catalyst compound on the carrier in one step. Due to the reduction in manufacturing time and the reduction in amount of a solvent used, the hybrid support may be said to be much more cost-effective than individual supports.

The carrier is a solid that disperses and stably retains a material having a catalytic function, and is usually a material having a large porosity or a large area so as to be highly dispersed and supported so as to increase the exposed surface area of the material having the catalytic function. The carrier should be stable mechanically, thermally, and chemically. Examples of the carrier include silica, alumina, titanium oxide, zeolite, zinc oxide, starch, and synthetic polymer, but the present invention is not limited thereto.

The carrier may have an average particle size of 10 microns to 250 microns, preferably 10 microns to 150 microns, and more preferably 20 microns to 100 microns.

The carrier may have a microporous volume of 0.1 cc/g to 10 cc/g, preferably 0.5 cc/g to 5 cc/g, and more preferably 1.0 cc/g to 3.0 cc/g.

In addition, the carrier may have a specific surface area of 1 $m^2$/g to 1,000 $m^2$/g, preferably 100 $m^2$/g to 800 $m^2$/g, and more preferably 200 $m^2$/g to 600 $m^2$/g.

When the carrier is silica, silica may have a drying temperature of 200° C. to 900° C. The drying temperature may be preferably 300° C. to 800° C., and more preferably 400° C. to 700° C. When the drying temperature is less than 200° C., too much moisture causes surface moisture to react with the cocatalyst. When the drying temperature exceeds 900° C., the structure of the catalyst collapses. The concentration of the hydroxyl group in the dried silica may be 0.1 mmol/g to 5 mmol/g, preferably from 0.7 mmol/g to 4 mmol/g, and more preferably 1.0 mmol/g to 2 mmol/g. When the concentration of the hydroxyl group is less than 0.5 mmol/g, a supported amount of the cocatalyst is lowered. When the concentration of the hydroxyl group exceeds 5 mmol/g, the catalyst component is deactivated, which is not preferable.

The supported hybrid metallocene catalyst according to the present invention may be manufactured by activating the metallocene catalyst and supporting the activated metallocene catalyst on the carrier. In the manufacture of the supported hybrid metallocene, the cocatalyst may be first supported on the carrier. The activation of the metallocene catalyst may be independently performed and may vary depending on the situation. That is, the first metallocene compound and the second metallocene compound may be mixed, activated, and then supported on the carrier. The first metallocene compound and the second metallocene compound may be supported after the cocatalyst compound is supported on the carrier.

Examples of the solvent of the reaction in the manufacture of the supported hybrid metallocene catalyst include an aliphatic hydrocarbon solvent such as hexane or pentane, an aromatic hydrocarbon solvent such as toluene or benzene, a hydrocarbon solvent substituted with a chlorine atom such as dichloromethane, an ether-based solvent such as diethyl ether or tetrahydrofuran, and most organic solvents such as acetone or ethyl acetate. Toluene or hexane is preferable, but the present invention is not limited thereto.

The reaction temperature in the production of the catalyst is 0° C. to 100° C., and preferably 25° C. to 70° C., but the present invention is not limited thereto.

The reaction time in the manufacture of the catalyst is 3 minutes to 48 hours, and preferably 5 minutes to 24 hours, but the present invention is not limited thereto.

The activation of the metallocene compound may be manufactured by mixing (contacting) the cocatalyst compound. The mixing may be performed in an inert atmosphere, typically nitrogen or argon, without using a solvent, or in the presence of the hydrocarbon solvent.

The temperature in the activation of the first and second metallocene compounds may be 0° C. to 100° C., and preferably 10° C. to 30° C.

When the first and second metallocene compounds are activated with the cocatalyst compound, the stirring time may be 5 minutes to 24 hours, and preferably 30 minutes to 3 hours.

In the metallocene compound, the catalyst composition in a solution state, which is uniformly dissolved in the hydrocarbon solvent or the like, is used as it is. Alternatively, the metallocene compound may be used in a solid powder state in which the solvent is removed by using a precipitation reaction and vacuum drying is performed at 20° C. to 200° C. for 1 hour to 48 hours. However, the present invention is not limited thereto.

The method for manufacturing the high-density ethylene-based polymer according to the present invention includes manufacturing a polyolefin homopolymer or copolymer by contacting the supported hybrid metallocene catalyst with at least one olefin monomer.

The method (polymerization reaction) for manufacturing the high-density polyethylene polymer according to the present invention may be a slurry phase polymerization reaction using an autoclave reactor or may be a gas phase polymerization reaction using a gas phase polymerization reactor. In addition, the respective polymerization reaction conditions may be variously modified according to the desired polymerization result of the polymerization method (slurry phase polymerization, gas phase polymerization) or the form of the polymer. The degree of the modification thereof may be easily performed by those of ordinary skill in the art.

When the polymerization is performed in a liquid phase or a slurry phase, a solvent or olefin itself may be used as a medium. Examples of the solvent may include propane, butane, pentane, hexane, octane, decane, dodecane, cyclopentane, methylcyclopentane, cyclohexane, methylcyclohexane, benzene, toluene, xylene, dichloromethane, chloroethane, dichloroethane, and chlorobenzene, and these solvents may be mixed at a predetermined ratio, but the present invention is not limited thereto.

In a specific example, examples of the olefin monomer may include ethylene, α-olefins, cyclic olefins, dienes, trienes, and styrenes, but the present invention is not limited thereto.

The α-olefins include a $C_3$-$C_{12}$ (for example, $C_3$-$C_8$) aliphatic olefin. Specific examples of the α-olefins may include propylene, 1-butene, 1-pentene, 3-methyl-1-butene, 1-hexene, 4-methyl-1-pentene, 3-methyl-1-pentene, 1-hexene, 1-heptene, 1-octene, 1-decene, 1-1-undecene, 1-dodecene, 1-tetradecene, 1-hexadecene, 1-aitosen, 4,4-dimethyl-1-pentene, 4,4-diethyl-1-hexene, and 3,4-dimethyl-1-hexene.

The α-olefins may be homopolymerized, or two or more olefins may be alternating, random, or block copolymerized. The copolymerization of the α-olefins may include copolymerization of ethylene and a $C_3$-$C_{12}$ (for example, $C_3$-$C_8$) α-olefin (specifically, ethylene and propylene, ethylene and 1-butene, ethylene and 1-hexene, ethylene and 4-methyl-1-pentene, ethylene and 1-octene, or the like) and copolymerization of propylene and a $C_4$-$C_{12}$ (for example, $C_4$-$C_8$) α-olefins (specifically, propylene and 1-butene, propylene and 4-methyl-1-pentene, propylene and 4-methyl-butene, propylene and 1-hexene, propylene and 1-octene, or the like). In the copolymerization of ethylene or propylene and another α-olefin, the amount of the other α-olefin may be 99 mol % or less of the total monomer, and preferably 80 mol % or less in the case of the ethylene copolymer.

Preferable examples of the olefin monomer may include ethylene, propylene, 1-butene, 1-hexene, 1-octene, 1-decene, or mixtures thereof, but the present invention is not limited thereto.

In the method for manufacturing the high-density polyethylene resin according to the present invention, the amount of the catalyst composition used is not particularly limited. For example, in the polymerization reaction system, the central metal (M, group 4 transition metal) represented by Formulae 1 and 2 may have a concentration of $1*10^{-5}$ mol/l to $9*10^{-5}$ mol/l.

In addition, the temperature and pressure at the time of polymerization may be changed according to the reactant, the reaction condition, and the like, and are thus not particularly limited. However, in the case of the solution polymerization, the polymerization temperature may be 0° C. to 200° C., and preferably 100° C. to 180° C., and in the case of the slurry phase or gas phase polymerization, the polymerization temperature may be 0° C. to 120° C., and preferably 60° C. to 100° C.

In addition, the polymerization pressure may be 1 bar to 150 bar, preferably 30 bar to 90 bar, and more preferably 10 bar to 20 bar. The pressure may be applied by injecting an olefin monomer gas (for example, ethylene gas).

For example, the polymerization may be performed in a batch (for example, autoclave reactor), semi-continuous, or continuous (for example, gas phase polymerization reactor) manner. The polymerization may also be performed in two or more steps having different reaction conditions, and the molecular weight of the final polymer may be controlled by changing the polymerization temperature or injecting hydrogen into a reactor.

The high-density ethylene-based resin according to the present invention may be obtained by homopolymerization of ethylene or copolymerization of ethylene and α-olefin using the supported hybrid metallocene compound as a catalyst, and has a unimodal molecular weight distribution.

Hereinafter, the high-density ethylene-based polymer according to the present invention will be specifically described.

The high-density ethylene-based polymer according to the present invention may have a density of 0.930 g/cm³ to 0.970 g/cm³, and more preferably 0.950 g/cm³ to 0.965 g/cm³. When the density of the polymer is 0.930 g/cm³ or less, the polymer may not exhibit sufficiently high toughness. When the density of the polymer is 0.970 g/cm³ or more, it is not preferable since the degree of crystallization becomes excessively large and brittle fracture easily occurs in a molded body.

Generally, when a melt index (MI) increases, moldability is improved, but impact resistance is deteriorated. For this reason, in the case of increasing the MI so as to improve the moldability, a method is used which forms a short chain branched structure (reduction in density) through general copolymerization so as to prevent deterioration of impact resistance. However, since the reduction in density of ethylene leads to deterioration of the toughness of the polymer, there is a limitation in application due to the reduction in density. When the MI is lowered, impact resistance and chemical resistance are improved, but melt flowability is deteriorated and moldability is significantly deteriorated. In contrast, the high-density polyethylene polymer according to the present invention has a low MI and thus exhibits excellent impact resistance and chemical resistance, unlike a conventional high-density polyethylene polymer. In addition, the high-density polyethylene polymer according to the present invention has a wide molecular weight distribution and a long chain branch, and thus exhibits excellent injection moldability.

The melt flowability used herein mainly corresponds to an extrusion load at the time of extruding a molten resin from an extruder, and MI, MFI, MFR, or the like is used as an index for the standard of the melt flowability. In the present invention, the MI (melt index) indicates flowability in a load of 2.16 kg at 190° C., and the MFI indicates flowability in a load of 21.6 kg at 190° C. The MFR indicates a ratio of MFI to MI, that is, MFI/MI.

The high-density ethylene-based polymer according to the present invention may have an MI of 0.1 g/10 min to 50 g/10 min, and preferably 0.5 g/10 min to 10 g/10 min. When the MI is 0.1 g/10 min or less, the molding processability is significantly deteriorated when the polymer is used as an injection molding material, and the appearance of the injection product is poor. When the MI is greater than 50 g/10 min, the impact resistance is significantly lowered.

The high-density ethylene-based polymer according to the present invention may have an MFR of 35 to 100, and more preferably 37 to 80. When the MFR is 35 or less, molding processability is significantly deteriorated when the polymer is used as an injection molding material. If the MFR is 100 or more, mechanical properties are deteriorated.

In addition, the supported hybrid metallocene catalyst according to the present invention can induce the generation of the long chain branch in the produced high-density ethylene-based polymer. Accordingly, it is possible to produce the high-density ethylene-based polymer including a long chain branch (LCB) having side branches of 6 or more carbon atoms in a main chain.

Strain hardening of a polymer having the long chain branch according to the present invention is 2.5 to 4.0, and preferably 2.7 to 3.8, when measured at 150° C., a constant extensional rate of 0.5 (1/s), and uniaxial extension.

If the strain hardening is large, molding processability upon injection is significantly improved and processing flowability is improved, thereby greatly reducing a load upon extrusion.

In addition, the olefin-based polymer including the long chain branch has excellent swell, bubble stability, melt fracture, sagging time, and the like and can be variously applied according to applications. As such, the olefin-based polymer including the long chain branch has excellent processability and excellent physical properties of the polymer itself.

The supported hybrid metallocene catalyst according to the present invention exhibits excellent catalytic activity. When the olefin polymer is manufactured by using the supported hybrid metallocene catalyst according to the present invention, it is possible to manufacture a polymer which has a wide molecular weight distribution and in which a comonomer is concentrated in a high-molecular-weight body. Since the olefin polymer has excellent impact strength, flexural strength, environmental stress cracking resistance, and melt tension, the olefin polymer may be used for a blow molded product, an injection molded product, a film, a pipe, and an extrusion molded product.

FIG. 1 shows comparison of injection moldability between a copolymer manufactured in Example 4 and commercial products manufactured in Comparative Examples 1 to 3 according to a pressure. A polymer is put into a mold at a temperature of 200° C. to 220° C. for 10 seconds, and it is shown that processability is excellent as a filled sample length becomes longer. Referring to FIG. 1 and Table 2, the high-density polyethylene resin according to the present invention has a low MI, but exhibits more excellent processability than a conventional HDPE due to high MFR characteristics.

Figure 2:
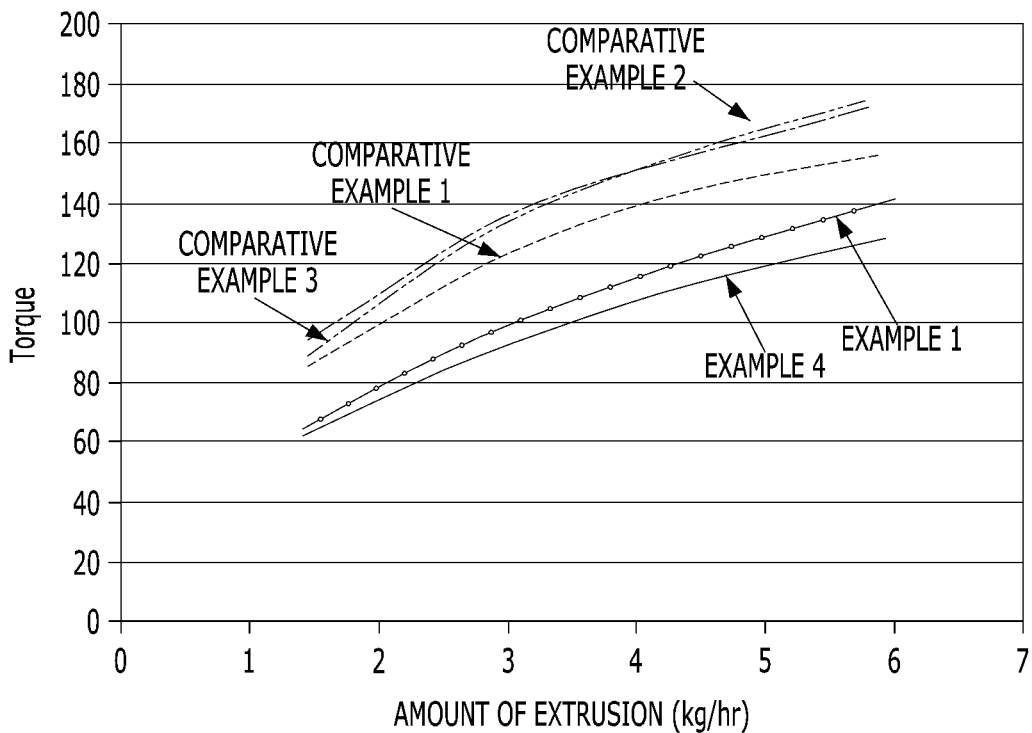
FIG. 2 shows comparison of processability between copolymers manufactured in Examples 1 and 4 and commercial products manufactured in Comparative Examples 1 to 3.
Figure 3:
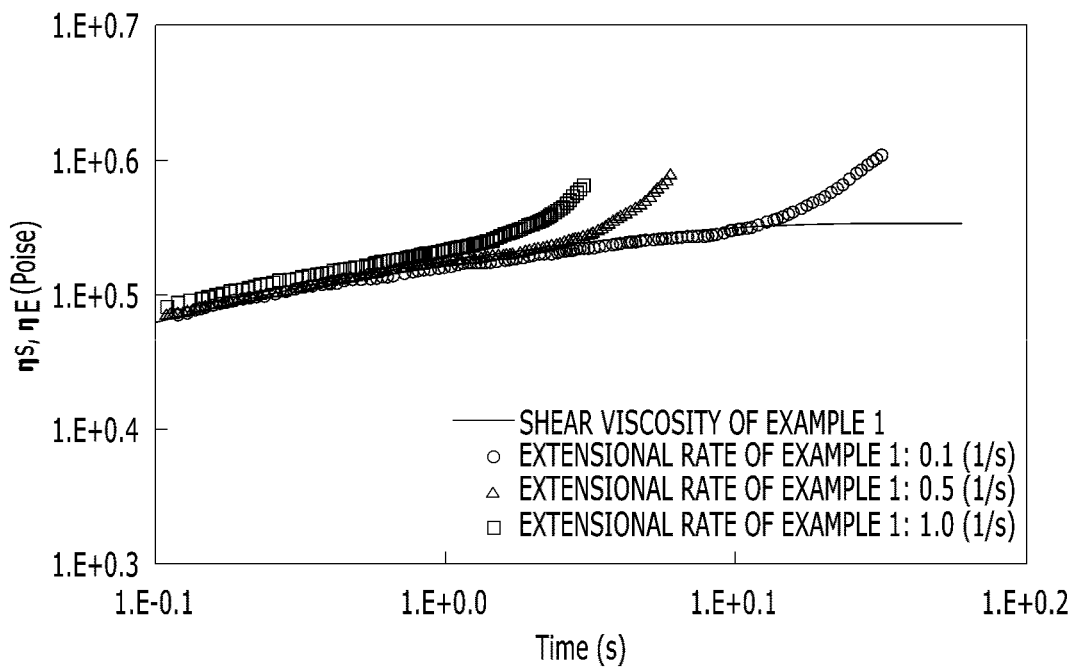
FIG. 3 is a graph showing measurement results of an actual extensional viscosity and a shear viscosity of Example 1. A solid line represents the measured shear viscosity, and figures represent extensional thickening at an extensional rate of 0.1, 0.5, and 1.0 (1/s).
Figure 4:
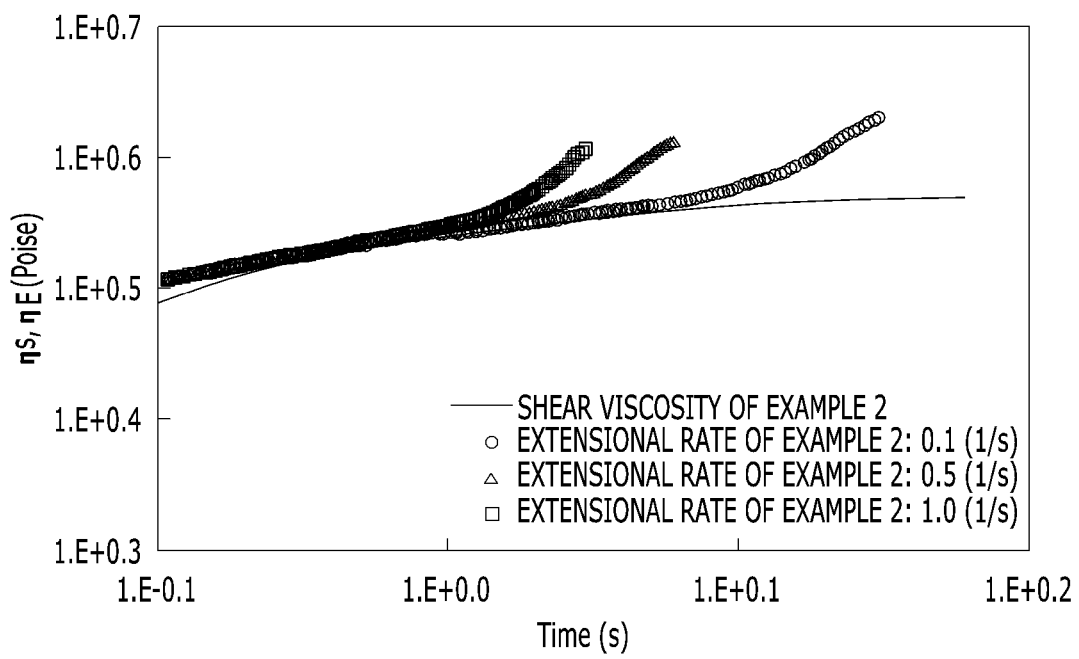
FIG. 4 is a graph showing measurement results of an actual extensional viscosity and a shear viscosity of Example 2. A solid line represents the measured shear viscosity, and figures represent extensional thickening at an extensional rate of 0.1, 0.5, and 1.0 (1/s).
Figure 5:
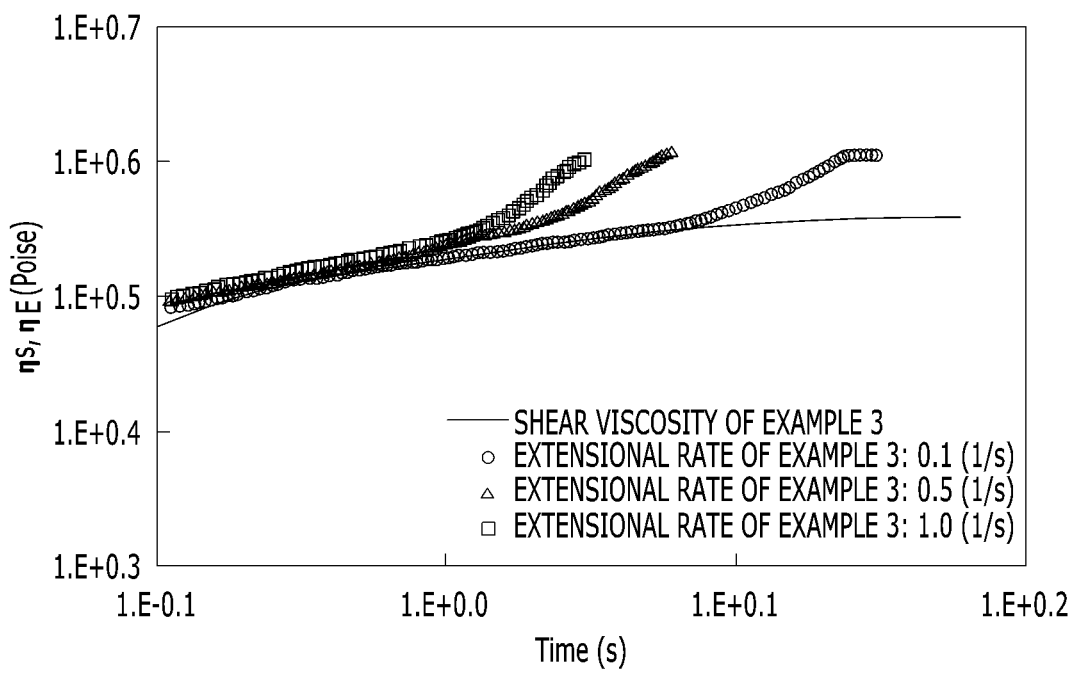
FIG. 5 is a graph showing measurement results of an actual extensional viscosity and a shear viscosity of Example 3. A solid line represents the measured shear viscosity, and figures represent extensional thickening at an extensional rate of 0.1, 0.5, and 1.0 (1/s).
Figure 6:
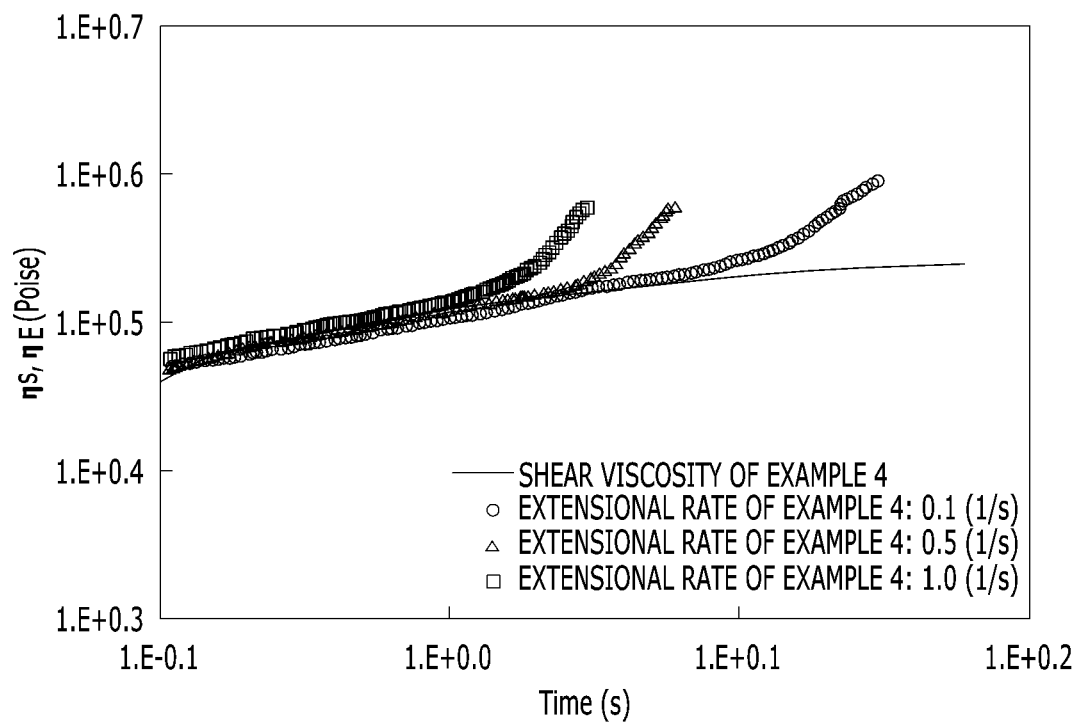
FIG. 6 is a graph showing measurement results of an actual extensional viscosity and a shear viscosity of Example 4. A solid line represents the measured shear viscosity, and figures represent extensional thickening at an extensional rate of 0.1, 0.5, and 1.0 (1/s).
Figure 7:
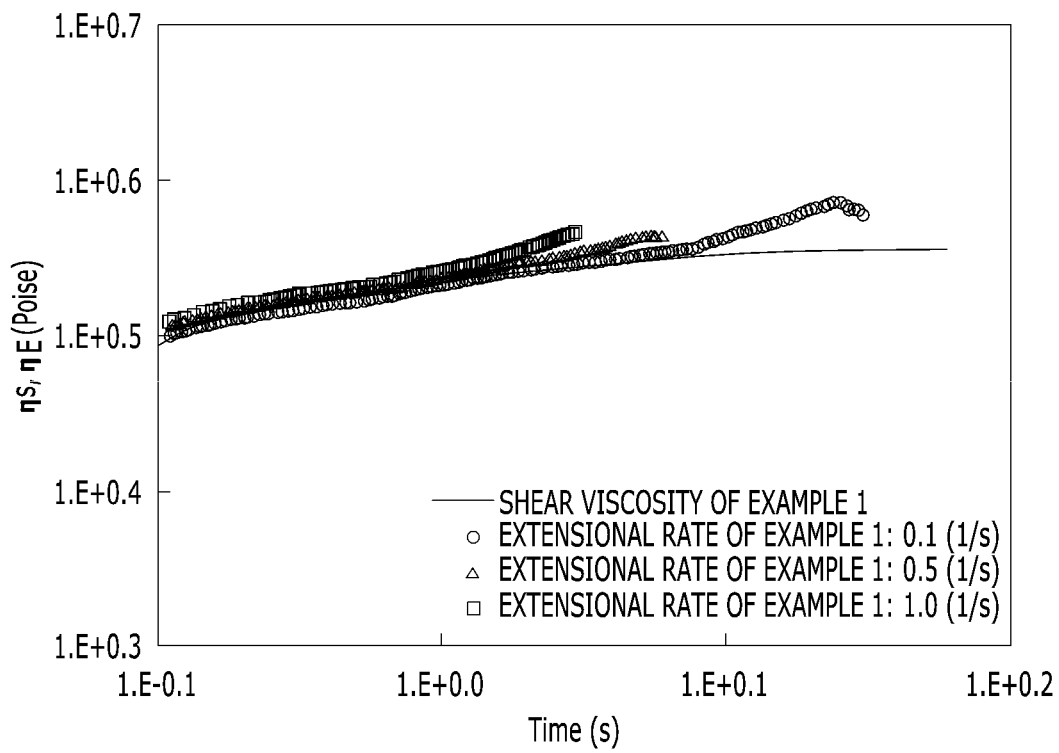
FIG. 7 is a graph showing measurement results of an actual extensional viscosity and a shear viscosity of Comparative Example 1. A solid line represents the measured shear viscosity, and figures represent extensional thickening at an extensional rate of 0.1, 0.5, and 1.0 (1/s). It is possible to confirm that the phenomenon of extensional thickening is not high.
Figure 8:
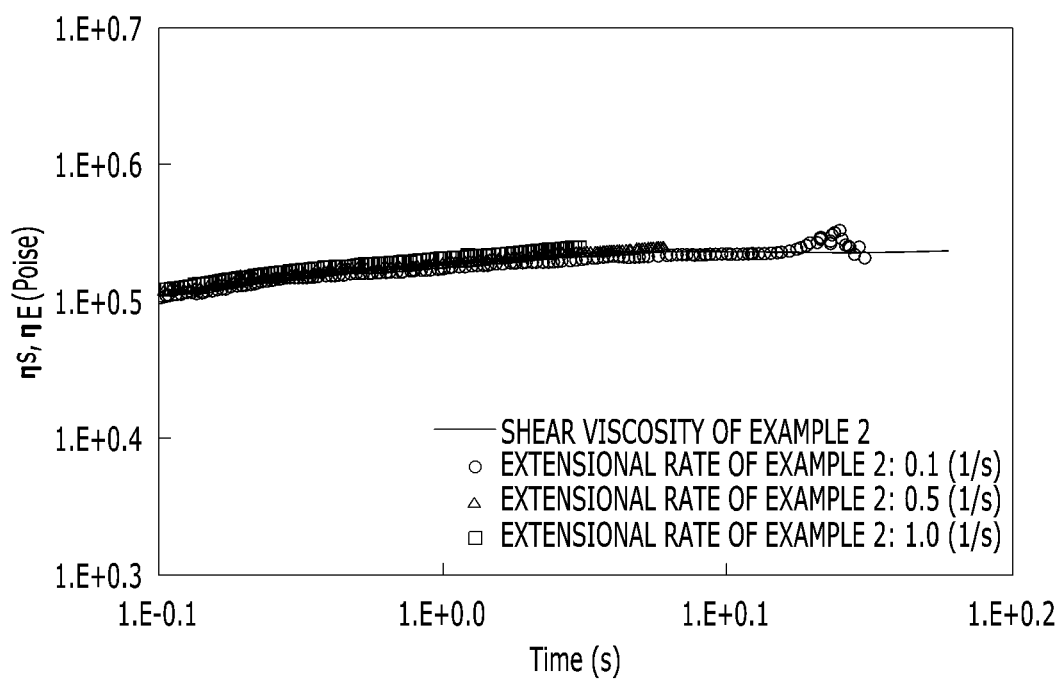
FIG. 8 is a graph showing measurement results of an actual extensional viscosity and a shear viscosity of Comparative Example 2. A solid line represents the measured shear viscosity, and figures represent extensional thickening at an extensional rate of 0.1, 0.5, and 1.0 (1/s). It is possible to confirm that the phenomenon of extensional thickening is not high.
Figure 9:
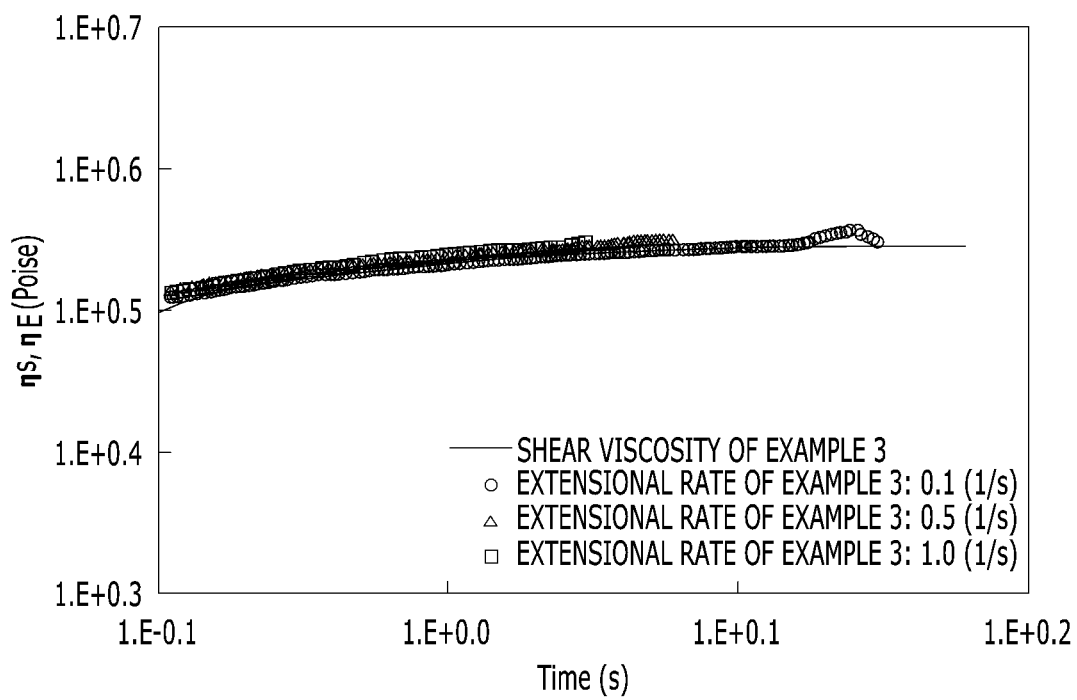
FIG. 9 is a graph showing measurement results of an actual extensional viscosity and a shear viscosity of Comparative Example 3. A solid line represents the measured shear viscosity, and figures represent extensional thickening at an extensional rate of 0.1, 0.5, and 1.0 (1/s). It is possible to confirm that the phenomenon of extensional thickening is not high.
Figure 10:
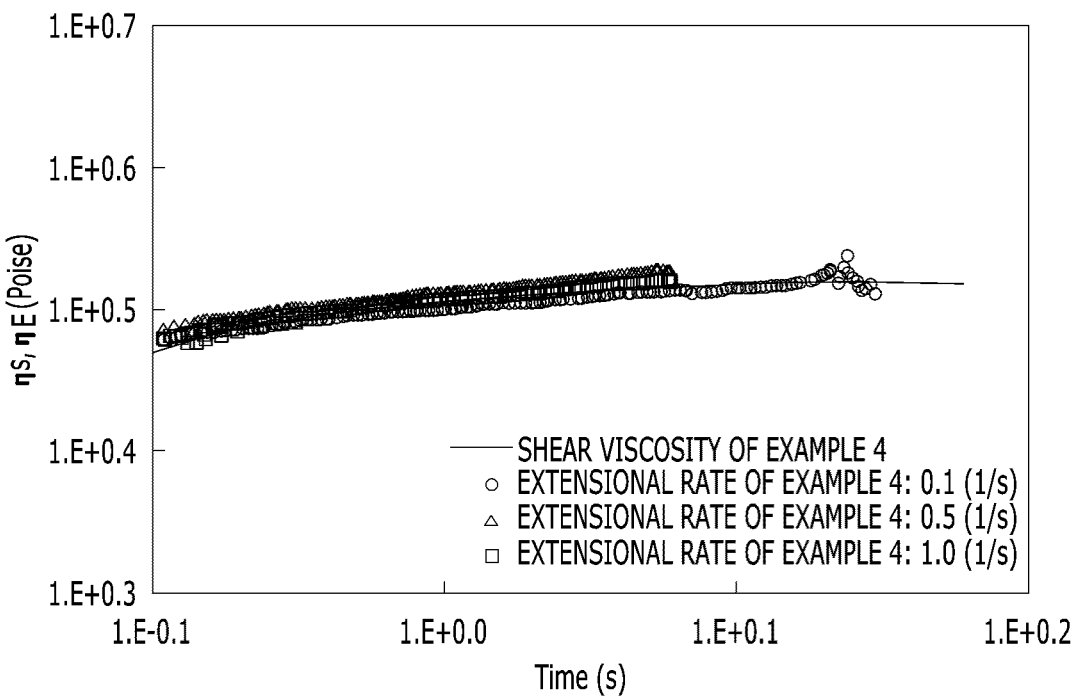
FIG. 10 is a graph showing measurement results of an actual extensional viscosity and a shear viscosity of Comparative Example 4. A solid line represents the measured shear viscosity, and figures represent extensional thickening at an extensional rate of 0.1, 0.5, and 1.0 (1/s). It is possible to confirm that the phenomenon of extensional thickening is not high.
Figure 11:
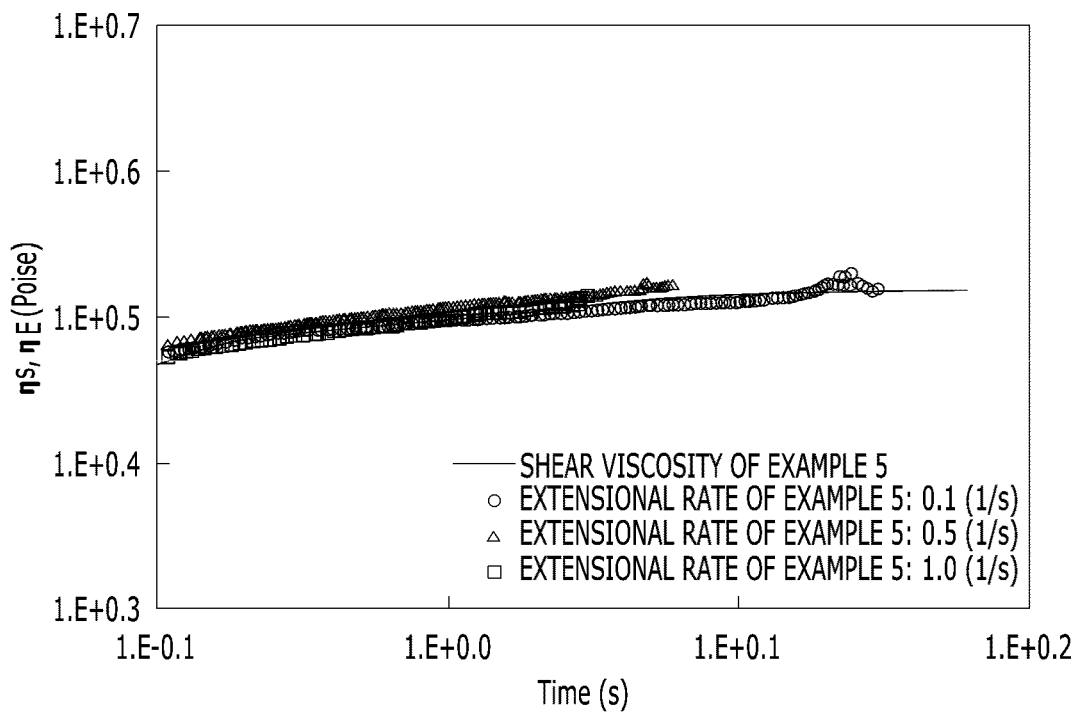
FIG. 11 is a graph showing measurement results of an actual extensional viscosity and a shear viscosity of Comparative Example 5. A solid line represents the measured shear viscosity, and figures represent extensional thickening at an extensional rate of 0.1, 0.5, and 1.0 (1/s). It is possible to confirm that the phenomenon of extensional thickening is not high.

FIG. 2 shows comparison of processability between copolymers manufactured in Examples 1 and 4 and commercial products manufactured in Comparative Examples 1 to 3. Generally, the MI or the molecular weight distribution is increased so as to improve processability. Due to this, the viscosity of the resin is lowered at the time of processing, and a low load is formed on a screw at the time of extrusion and injection, thereby enabling high-speed production. Referring to FIG. 2, the high-density polyethylene resin according to the present invention may form a low load, as compared with a conventional commercial product. Therefore, it can be confirmed that high-speed production is possible.

FIGS. 3, 4, 5, and 6 show measurement result values of actual extensional viscosities and shear viscosities of Examples 1, 2, 3, and 4. A solid line represents the measured shear viscosity, and figures represent extensional thickening at an extensional rate of 0.1, 0.5, and 1.0 (1/s).

The extensional thickening refers to the phenomenon of fluids in which the extensional viscosity increases as the extensional rate (or time) increases. The extensional thickening is a fluid concept opposed to extensional thinning in which the extensional viscosity decreases as the extensional rate (or time) increases.

In FIGS. 7, 8, 9, 10, and 11, it can be confirmed that the extensional thickening of Comparative Examples 1, 2, 3, 4, and 5 is not high.

Figure 12:
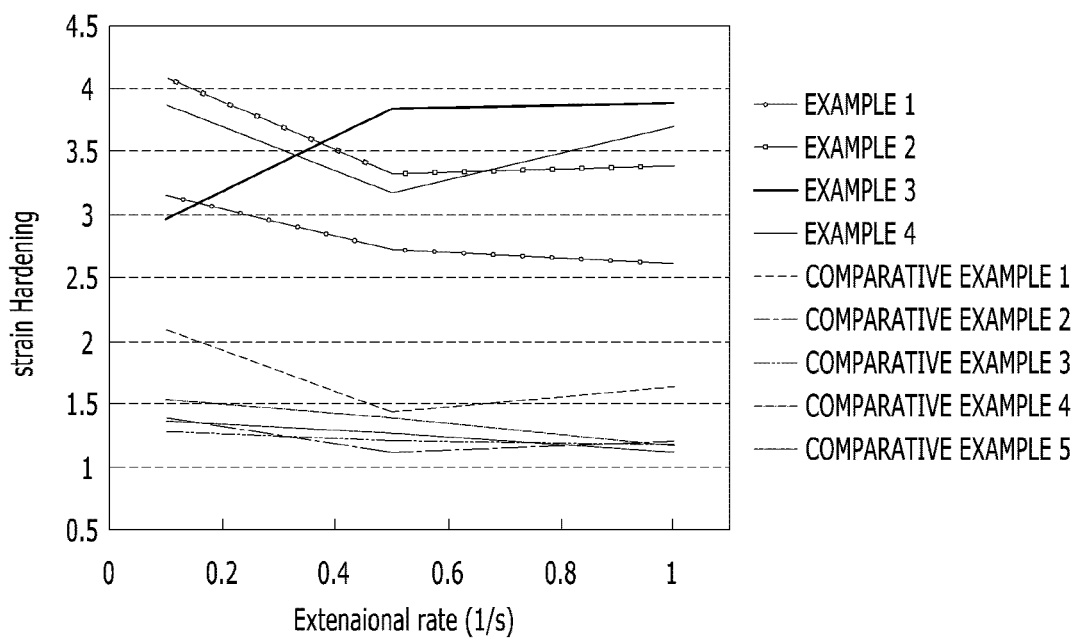
FIG. 12 is a graph showing strain hardening at variously measured extensional rates of 0.1 (1/s) to 1.0 (1/s), specifically, 0.1, 0.0.5, and 1.0 (1/s), with respect to Examples 1 to 4 and Comparative Examples 1 to 5.

FIG. 12 shows strain hardening at variously measured extensional rates of 0.1 (1/s) to 1.0 (1/s), specifically, 0.1, 0.0.5, and 1.0 (1/s). As is already known in the literatures, the polymer having a long chain branch exhibits strain hardening. This is a phenomenon in which the extensional viscosity increases as it is stretched. It was confirmed that the high-density polyethylene resin manufactured by using the supported hybrid metallocene catalyst exhibited strain hardening of 2.5 or more at variously measured extensional rates of 0.1 (1/s) to 1.0 (1/s), specifically, 0.1, 0.0.5, and 1.0 (1/s).

Table 2 shows that the high-density polyethylene resin according to the present invention is excellent in melt flowability, as compared with the conventional HDPE which is commercially used. It was confirmed that the high-density polyethylene resin according to the present invention exhibited high strain hardening and thus had excellent processability.

Generally, when the MI is low, the mechanical properties may be improved, but the melt flowability is deteriorated and the processability is deteriorated. However, it is confirmed that the high-density polyethylene resin according to the present invention has a low MI and thus has excellent mechanical properties, and includes a long chain branch and thus exhibits a high MFR, thereby providing excellent processability.

The high-density polyethylene resin according to the present invention has a low MI, but exhibits more excellent processability than the conventional HDPE due to high MFR characteristics.

The high-density ethylene-based polymer according to the present invention can be used as a material for injection molding, compression molding, or rotational molding.

EXAMPLES

Hereinafter, the structure and operation of the present invention will be described in more detail with reference to preferred examples of the present invention. However, these example are shown by way of illustration and should not be construed as limiting the present invention in any way.

Since contents not described here can be sufficiently technically inferred by those of ordinary skill in the art, descriptions thereof will be omitted.

Manufacture Example 1 of First Metallocene Compound. [Indenyl(cyclopentadienyl)]ZrCl$_2$ Indene (5 g, 0.043 mol) was dissolved in hexane (150 ml). The mixture was sufficiently mixed and cooled to a temperature of −30° C. 2.5M n-butyllithium (n-BuLi) hexane solution (17 ml, 0.043 mol) was slowly dropped thereto and stirred at room temperature for 12 hours. A white suspension was filtered through a glass filter, and a white solid was sufficiently dried to obtain an indene lithium salt (yield: 99%).

In a slurry solution of the indene lithium salt (1.05 g, 8.53 mmol), CpZrCl3 (2.24 g, 8.53 mmol) was slowly dissolved in ether (30 mL) and then cooled to a temperature of −30° C. An indene lithium salt dissolved in ether (15 mL) was slowly dropped to the ether solution and stirred for 24 hours to obtain [indenyl(cyclopentadienyl)]ZrCl$_2$ (yield: 97%). Here, Cp indicates cyclopentadienyl.

Manufacture Example 2 of First Metallocene Compound. [2-methyl benzeindenyl (cyclopentadienyl)]ZrCl$_2$

[2-methyl benzeindenyl (cyclopentadienyl)]ZrCl$_2$ (yield: 95%) was obtained in the same manner as in Manufacture Example 1 by using 2-methylbenzeindene.

Manufacture Example 3 of First Metallocene Compound. [2-phenyl benzeindenyl (tetramethylcyclopentadienyl)]ZrCl$_2$

[2-phenyl benzeindenyl (tetramethylcyclopentadienyl)] ZrCl$_2$ (yield: 93%) was obtained in the same manner as in Manufacture Example 1 by using 2-methylbenzeindene and tetrametylcyclopentadiene.

Manufacture Example 4 of First Metallocene Compound. [fluorenyl(cyclopentadienyl)]ZrCl$_2$

[2-phenyl benzeindenyl (tetramethylcyclopentadienyl)] ZrCl$_2$ (yield: 92%) was obtained in the same manner as in Manufacture Example 1 by using fluorene and cyclopentadiene.

Manufacture Example 5 of Second Metallocene Compound. Me$_2$Si{2-methyl-4-(1-naphthyl)}$_2$ZrCl$_2$ Manufacture Example 5-1: Manufacture of Ligand Compound 2-methyl-4-bromo indene (2 g, 1 eq), Pd(PPh3)4 (553 mg, 0.05 eq), and 1-NaphB(OH)2 (2.14 g, 1.3 eq) were added to a solution of THF and MeOH (4:1, 40 ml), and degassed K2CO3 aqueous solution (2.0 M, 3.3 eq) was added thereto at room temperature. The mixture was stirred under reflux at a temperature of 80° C. for 12 hours to obtain 2-methyl-4-(1-naphthyl)indene. 2-methyl-4-(1-naphthyl)indene was added to 50 mL of toluene, and n-BuLi (7.8 mL, 1.1 eq, 1.6 M in hexane) was slowly added thereto at a temperature of −30° C. The mixture was gradually heated to room temperature and stirred for 12 hours. A solid generated therefrom was filtered, washed with hexane, and dried under vacuum to obtain 2-methyl-4-(1-naphthyl)indenyl lithium.

SiMe$_2$Cl$_2$ (462 mg, 1 eq) was slowly added to 2-methyl-4-(1-naphthyl)indenyl lithium (1.88 g, 2 eq), 13 mL of toluene, and 3 mL of THF at a temperature of −30° C., and the mixture was gradually heated and stirred at a temperature of 55° C. for 12 hours to obtain 1.97 g (97%) of dimethylbis{2-methyl-4-(1-naphthyl)indenyl}silane.

Manufacture Example 5-2: Manufacture of Second Metallocene Compound

The compound (0.4 g, 1 eq) manufactured in Manufacture Example 5-1 was added to 15 mL of tetrahydrofuran (THF), and n-BuLi (1.32 mL, 2.2 eq, 1.6 M in hexane) was slowly added thereto at a temperature of −30° C. The mixture was gradually heated to room temperature and stirred for 12 hours to obtain dilithium salt. ZrCl$_4$ (435 mg, 1 eq) was slowly added to a dilithium salt slurry solution and stirred for 12 hours. A solvent was removed therefrom under vacuum, and a product obtained therefrom was washed with THF and MC to obtain Me$_2$Si{2-methyl-4-(1-naphthyl)}$_2$ZrCl$_2$ (yield: 94%).

Manufacture Example 6 of Second Metallocene Compound. Me$_2$Si{2-methyl-4-(2-naphthyl)}$_2$ZrCl$_2$ Manufacture Example 6-1: Manufacture of Ligand Compound Dimethylbis{2-methyl-4-(2-naphthyl) indenyl)}silane (yield: 51%) was obtained in the same manner as in Manufacture Example 5-1 by using 2-methyl-7-(2-naphthyl)indene.

Manufacture Example 6-2: Manufacture of Second Metallocene Compound

Me$_2$Si{2-methyl-4-(2-naphthyl)}$_2$ZrCl$_2$ (yield: 90%) was obtained in the same manner as in Manufacture Example 5-2 by using the compound manufactured in Manufacture Example 6-1.

Manufacture Example 7 of Second Metallocene Compound. (Me$_2$Si(2-methyl-4-phenyl indenyl)$_2$ZrCl$_2$)

Manufacture Example 7-1: Manufacture of Ligand Compound 2-methyl-4-bromo indene (2 g, 1 eq) (7 g, 1 eq) and Ni(dppp)Cl$_2$ (363 mg, 0.02 eq) were added to ether (100 mL), and PhMgBr (3.0 M in ether, 13.3 g, 1.05 eq) was added thereto at a temperature of 0° C. for 1 hour. The mixture was gradually heated to room temperature (25° C.) and stirred under reflux at a temperature of 50° C. for 12 hours. After the reaction was completed, the solution was immersed in an ice bath, and 1N HCl was added thereto to lower pH to 4. An organic layer was extracted therefrom with a separatory funnel and treated with MgSO4 to remove water therefrom. The organic layer was filtered and a solvent was dried to obtain 2-methyl-4-(phenyl)indene (yield: 97%). Me$_2$Si(2-methyl-4-phenyl indenyl)$_2$ (yield: 95%) was manufactured in the same manner as in Manufacture Example 5-1 by using 2-methyl-4-(phenyl)indene. Here, dppp indicates 1,3-bis(diphenylphosphino)propane.

Manufacture Example 7-2: Manufacture of Second Metallocene Compound

Me$_2$Si(2-methyl-4-phenyl indenyl)$_2$ZrCl$_2$ (yield: 90%) was obtained in the same manner as in Manufacture Example 5-2 by using Me$_2$Si(2-methyl-4-phenylindene)$_2$.

Manufacture Example 8 of Supported Hybrid Metallocene Catalyst

The first and second metallocene compounds and methylaluminoxane (MAO) as the cocatalyst lost activity when reacted with moisture or oxygen in the air. Therefore, all experiments were performed under a nitrogen condition by using a glove box and a Schlenk technique. A 10 L supported catalyst reactor was washed to remove foreign matter therefrom. The 10 L supported catalyst reactor was closed while drying at a temperature of 110° C. for 3 hours or more, and was then in a state in which moisture or the like was completely removed using a vacuum.

10 wt % of methylalumoxane (MAO) solution (methylaluminoxane: 1,188 g) was added to 2.862 g of the compound manufactured in Manufacture Example 1 and 3.469 g of the compound manufactured in Manufacture Example 7-2, and the mixture was stirred at room temperature for 1 hour. After 300 g of silica (XPO2402) was added to the reactor, 900 mL of purified toluene was added to the reactor and then stirred. After the stirring step for 1 hour was completed, a first metallocene compound, a second metallocene compound, and a methylaluminoxane mixed solution were added to the reactor while stirring the reactor. The reactor was heated to a temperature of 60° C. and stirred for 2 hours.

After a precipitation reaction, a supernatant was removed, washed with 1 L of toluene, and vacuum-dried at a temperature of 60° C. for 12 hours.

Manufacture Example 9 of Supported Hybrid Metallocene Catalyst

A supported hybrid metallocene catalyst was manufactured in the same manner as in Manufacture Example 8, except that 2.389 g of the compound manufactured in Manufacture Example 2 and 4.387 g of the compound manufactured in Manufacture Example 7-2 were used.

Manufacture Example 10 of Supported Hybrid Metallocene Catalyst

A supported hybrid metallocene catalyst was manufactured in the same manner as in Manufacture Example 8, except that 2.712 g of the compound manufactured in Manufacture Example 3 and 3.046 g of the compound manufactured in Manufacture Example 6-2 were used.

Manufacture Example 11 of Supported Hybrid Metallocene Catalyst

A supported hybrid metallocene catalyst was manufactured in the same manner as in Manufacture Example 8, except that 2.662 g of the compound manufactured in Manufacture Example 4 and 3.712 g of the compound manufactured in Manufacture Example 5-2 were used.

Example 1

An olefin polymer was manufactured by adding the supported hybrid metallocene catalyst obtained in Manufacture Example 8 to a continuous polymerization reactor for a fluidized bed gas process. 1-hexene was used as a comonomer, a reactor ethylene pressure was maintained at 15 bar, and a polymerization temperature was maintained at 80° C. to 90° C.

Examples 2 to 4

Olefin polymers were manufactured in the same manner as in Example 1, except that the supported hybrid metallocene catalysts manufactured in Manufacture Examples 9 to 11 were used.

Comparative Example 1

A commercial product HDPE 7303 (manufactured by SK Global Chemical Co., Ltd.) was used.

Comparative Example 1 has a density of 0.9523 g/cm$^3$ according to ASTM D1505 and a melt index (MI) of 2.1 g/10 min according to ASTM D1238.

Comparative Example 2

A commercial product HDPE C910A (manufactured by Hanwha Total Petrochemical Co., Ltd.) was used.

Comparative Example 2 has a density of 0.9556 g/cm$^3$ according to ASTM D1505 and a melt index (MI) of 2.4 g/10 min according to ASTM D1238.

Comparative Example 3

A commercial product HDPE ME2500 (manufactured by LG Chemical Co., Ltd.) was used.

Comparative Example 3 has a density of 0.9538 g/cm$^3$ according to ASTM D1505 and a melt index (MI) of 2.1 g/10 min according to ASTM D1238.

Comparative Example 4

A commercial product HDPE M850 (manufactured by Korea Petrochemical Ind. Co., Ltd.) was used.

Comparative Example 4 has a density of 0.9642 g/cm$^3$ according to ASTM D1505 and a melt index (MI) of 4.9 g/10 min according to ASTM D1238.

Comparative Example 5

A commercial product HDPE 2200J (manufactured by Lotte Chemical Corporation) was used.

Comparative Example 5 has a density of 0.9582 g/cm$^3$ according to ASTM D1505 and a melt index (MI) of 5.1 g/10 min according to ASTM D1238.

<Physical Property Measurement Method>

1) A density was measured according to ASTM 1505.

2) MI, MFI, and MFR

Melt flowability MI was an amount of extrusion for 10 minutes at a load of 2.16 kg, and was measured at a measurement temperature of 190° C. according to ASTM 1238.

MFI was an amount of extrusion for 10 minutes at a load of 21.6 kg, and was measured at a measurement temperature of 190° C. according to ASTM 1238.

MFR indicates a ratio of MFI to MI, that is, MFI/MI.

3) Strain hardening or elongational hardening was measured in a molten state of 150° C. in uniaxial extension.

The measurement was made using an extensional viscosity fixture (EVF) of ARES of TA. After a preheating time of 30 seconds at a measurement temperature of 150° C., the measurement was made at a predetermined extensional rate. The extensional rate was measured at 0.1, 0.5, and 1.0 (1/s).

A test sample has a length of 18 mm, a width of 10 mm, and a thickness of 0.7 mm.

Strain hardening in the uniaxial extension is represented by a ratio of melt shear viscosity ($\eta_E$) measured at the same time as melt extensional viscosity ($\eta_{E,max}$) of a maximum value at a predetermined extensional rate. In the measurement of the extensional viscosity, extensional rate*time (=strain) was fixed to 3, and the measurement was made at a predetermined extensional rate after a preheating time of 30 seconds at a measurement temperature of 150° C.

The shear viscosity ($\eta_s$) was measured by a function of time at a low shear rate. The shear rate measured at 150° C. was 0.1 (1/s). The extensional viscosity according to the time was calculated by multiplying 3 according to a Trouton ratio.

This method is disclosed in Christopher W. Macosko's Rheology Principles, Measurements, and Applications, published in 1994 by Wiley-VCH. According to this disclosure, the long chain branch of the ethylene-based polymer is directly associated with the strain hardening in the uniaxial extension.

The ASTM is the name of the standard and is divided into 1) definition of common terms in the field, 2) sequence that is considered to be appropriate so as to achieve a given task, 3) method for making a given measurement, 4) criteria for dividing objects or concepts into groups, and 5) determining the range or limitation of characteristics of a product or material.

In addition, the MI, i.e., melt index, is a term indicating melt flowability of a plastic material having a predetermined load at a predetermined temperature. As the melt index is higher, the processability of the polymer is more excellent. The melt index is inversely proportional to the molecular weight. A polyolefin-based resin may be manufactured by various molding methods, but these methods are common in that the resin is first heated to a molten state and then molded. Therefore, the melting property is an extremely important property in the molding of the polyolefin-based resin. In particular, in the molding such as extrusion molding, compression molding, injection molding, or rotational molding, the melting property, that is, the melt flowability, is an essential property that affects satisfactory moldability. As the melt flow index is larger, the flow becomes easier.

In the present invention, the MI indicates flowability in a load of 2.16 kg at 190° C., and the MFI indicates flowability in a load of 21.6 kg at 190° C. MFR indicates a ratio of MFI to MI, that is, MFI/MI.

The polymerization conditions of Examples 1 to 10 and Comparative Examples 5 to 8 are shown in Table 1.

Strain hardening is the same as described above.

Table 1 shows the polymerization conditions of Examples 1 to 4.

TABLE 1

|  | Ethylene Pressure (bar) | Hydrogen/ Ethylene Mole Ratio (%) | 1-Hexene/ Ethylene Mole Ratio (%) | Catalyst Activity (gPE/gCat) |
|---|---|---|---|---|
| Example 1 | 15 | 0.125 | 0.159 | 5100 |
| Example 2 | 15.2 | 0.115 | 0.168 | 5000 |
| Example 3 | 14.7 | 0.082 | 0.31 | 4800 |
| Example 4 | 14.4 | 0.101 | 0.161 | 4900 |

Table 2 below shows the above-described physical property measurement data. When compared with five commercially available HDPEs, it is confirmed that the high-density polyethylene copolymer according to the present invention has excellent melt flowability and excellent mechanical properties.

TABLE 2

|  | Density (g/cm³) | MI (g/10 min) | MFR | Strain Hardening (0.1/s, 150° C.) | Strain Hardening (0.5/s, 150° C.) | Strain Hardening (1.0/s, 150° C.) | Mold Flowability (cm, 18 bar) | Mold Flowability (cm, 21 bar) |
|---|---|---|---|---|---|---|---|---|
| Example 1 | 0.9518 | 2.6 | 42.7 | 3.2 | 2.7 | 2.6 | 1.8 | 4.3 |
| Example 2 | 0.9561 | 3.1 | 44.4 | 4.1 | 3.3 | 3.4 | 4 | 6.7 |
| Example 3 | 0.9562 | 1.1 | 64 | 3 | 3.8 | 3.9 | 0.7 | 1.5 |
| Example 4 | 0.9559 | 2.5 | 43.6 | 3.9 | 3.2 | 3.7 | 1.5 | 4.3 |
| Comparative Example 1 | 0.9523 | 2.1 | 37.4 | 2.1 | 1.4 | 1.6 | 0.2 | 1.2 |
| Comparative Example 2 | 0.9556 | 2.4 | 28.5 | 1.4 | 1.1 | 1.2 | 0 | 0.6 |
| Comparative Example 3 | 0.9538 | 2.1 | 28.5 | 1.3 | 1.2. | 1.2 | 0 | 0.5 |
| Comparative Example 4 | 0.9642 | 4.9 | 34.9 | 1.5 | 1.4 | 1.2 | 4 | 6.7 |
| Comparative Example 5 | 0.9582 | 5.1 | 32.6 | 1.4 | 1.3 | 1.1 | 3.8 | 6.4 |

In the production of the supported hybrid metallocene, in the asymmetric structure of the first metallocene of Formula 1 according to the present invention, an electron donating phenomenon in which electrons are donated to a central metal in a ligand is not the same. Thus, since bond lengths between the central metal and the ligand are different from each other, a steric hindrance when a monomer approaches a catalystic active site is low.

Since the second metallocene of Formula 2 has a bridge structure form, the second metallocene protects the catalystic active site and facilitates accessibility of the comonomer to the catalytic active site, thereby providing characteristics in which penetration of comonomer is excellent. In addition, as compared with the non-bridge structure in which the ligands are not linked to each other, the catalytic active site is stabilized to form a high molecular weight.

However, in the case of the metallocene of Formula 2 alone, activity is excessively low and is thus cost-ineffective, and a high-molecular-weight body is excessively formed and thus processability is deteriorated.

The high-density polyethylene resin manufactured by using the supported hybrid metallocene catalyst according to the present invention exhibits high strain hardening and thus have excellent processability.

It can be seen from Table 2 that the metallocene catalyst in which the first metallocene of Formula 1 and the second metallocene of Formula 2 are hybrid-supported exhibits a high MFR and thus exhibits excellent injection processability.

Generally, when the MI is low, the mechanical properties may be improved, but the melt flowability is deteriorated and the processability is deteriorated. However, it is confirmed that the high-density polyethylene resin according to the present invention has a low MI and thus has excellent mechanical properties, and includes a long chain branch and thus exhibits a high MFR, thereby providing excellent processability.

While the present invention has been particularly shown and described with reference to exemplary embodiments thereof, the present invention is not limited to the specific exemplary embodiments. It will be understood by those of ordinary skill in the art that various modifications may be made thereto without departing from the spirit and scope of the present invention as defined by the appended claims, and such modifications fall within the scope of the claims.

The invention claimed is:

1. A high-density ethylene-based polymer manufactured by polymerizing ethylene and at least one α-olefin monomer,
   wherein the polymer includes a long chain branch (LCB), a density is 0.930 g/cm³ to 0.970 g/cm³,
   an MI is 0.5 g/10 min to 10 g/10 min,
   an MFR is 35 to 100,
   strain hardening is 2.5 to 4.0 when measured at 150° C., a constant extensional rate of 0.5 (1/s), and uniaxial extension, is 2.8 to 4.3 when an extensional rate is 0.1 (1/s), and is 2.4 to 4.1 when the extensional rate is 1.0 (1/s), and
   mold flowability of the polymer is 0.5 cm to 5 cm when an injection pressure is 18 bar, and is 1.5 cm to 7.5 cm when the injection pressure is 21 bar.

2. The high-density ethylene-based polymer of claim 1, wherein the α-olefin monomer is selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-aitosen.

3. The high-density ethylene-based polymer of claim 1, wherein, when the high-density ethylene-based polymer is a copolymer of the ethylene and the α-olefin monomer, a content of the α-olefin monomer is 0.1 wt % to 10 wt %.

4. The high-density ethylene-based polymer of claim 1, wherein the ethylene-based polymer is a material for injection molding, compression molding, or rotational molding.

5. The high-density ethylene-based polymer of claim 1, wherein the high-density ethylene-based polymer is polymerized in the presence of a catalyst comprising at least one first metallocene compound represented by Formula 1, at least one second metallocene compound represented by Formula 2, at least one cocatalyst compound, and a carrier:

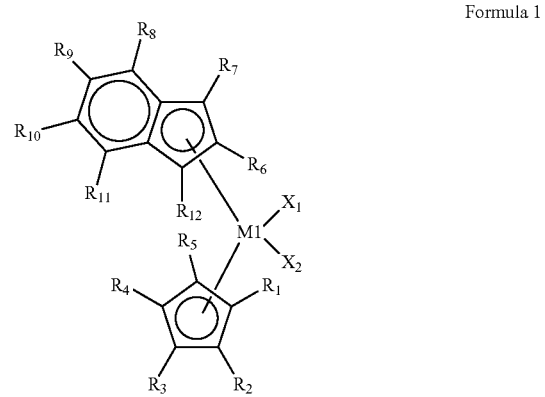

Formula 1 wherein, in Formula 1,
M1 is a group 4 transition metal of the periodic table of the elements,
$X_1$ and $X_2$ are each independently one of halogen atoms,
$R_1$ to $R_{12}$ are each independently a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and are linked to each other to form a ring,
cyclopentadienyl linked to $R_1$ to $R_5$ and indenyl linked to $R_6$ to $R_{12}$ have an asymmetric structure having different structures, and
the cyclopentadienyl and the indenyl are not linked to each other to form a non-bridge structure:

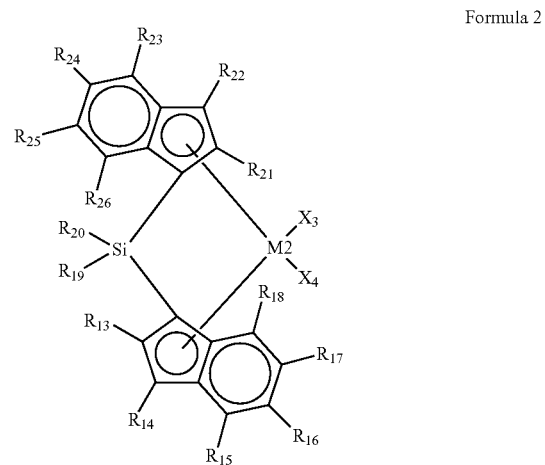

Formula 2 wherein, in Formula 2,
M2 is a group 4 transition metal of the periodic table of the elements,
$X_3$ and $X_4$ are each independently one of halogen atoms,
$R_{13}$ to $R_{18}$ are each independently a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and are linked to each other to form a ring,
$R_{21}$ to $R_{26}$ are each independently a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and are linked to each other to form a ring, $R_{19}$ and $R_{20}$ are each independently a substituted or unsubstituted $C_1$-$C_{20}$ alkyl group and are linked to each other to form a ring, indene linked to $R_{13}$ to $R_{18}$ and indene linked to $R_{21}$ to $R_{26}$ have the same structure or different structures, and the indene linked to $R_{13}$ to $R_{18}$ and the indene linked to $R_{21}$ to $R_{26}$ are linked to Si to form a bridge structure, wherein the substituted $C_1$-$C_{10}$ alkyl group, the substituted $C_6$-$C_{20}$ aryl group, the substituted $C_7$-$C_{40}$ alkylaryl group, the substituted $C_1$-$C_{20}$ alkyl group are a $C_1$-$C_{10}$ alkyl group, a $C_6$-$C_{20}$ aryl group, a $C_7$-$C_{40}$ alkylaryl group, and a $C_1$-$C_{20}$ alkyl group where a hydrogen atom is substituted with a substituent comprising a halogen atom, a $C_1$-$C_{20}$ hydrocarbon group, a $C_1$-$C_{20}$ alkoxy group, and a $C_6$-$C_{20}$ aryloxy group, respectively.

6. The high-density ethylene-based polymer of claim 5, wherein the first metallocene compound is selected from compounds having the following structures:

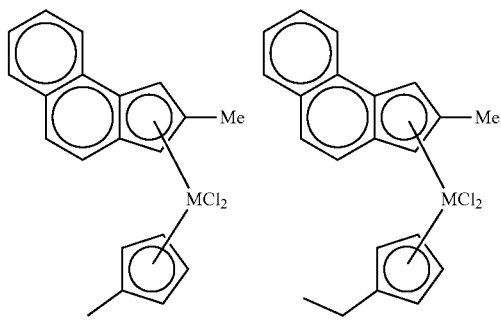

-continued

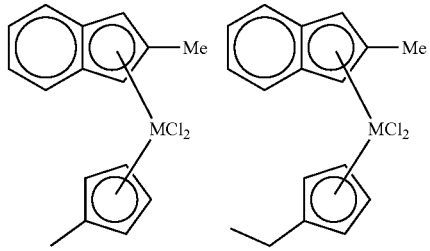

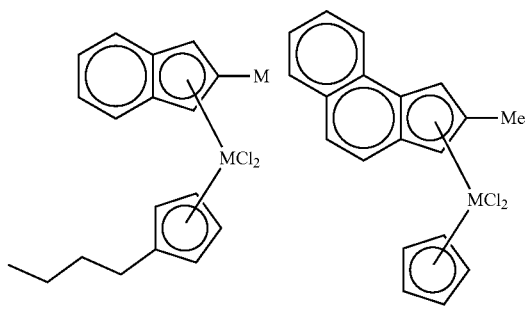

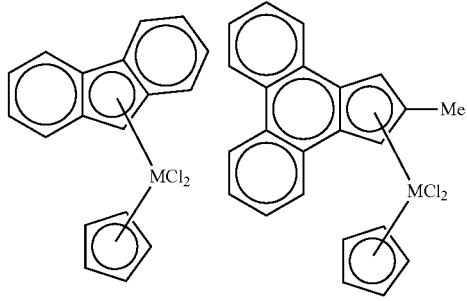

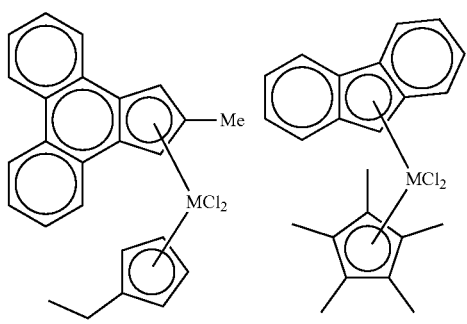

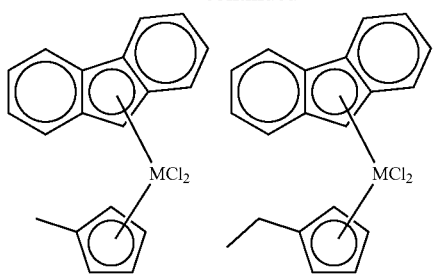
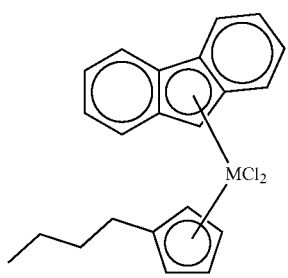
7. The high-density ethylene-based polymer of claim 5, wherein the second metallocene compound is selected from compounds having the following structures:
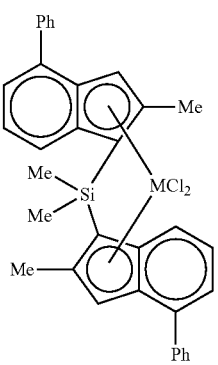
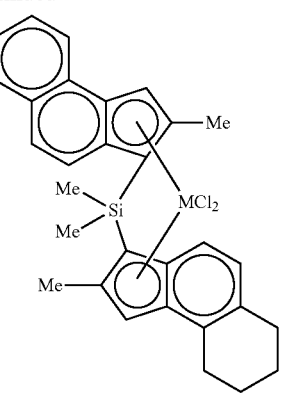
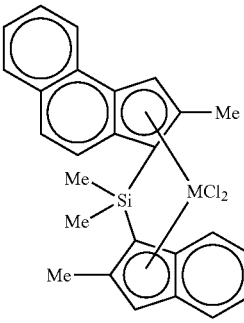
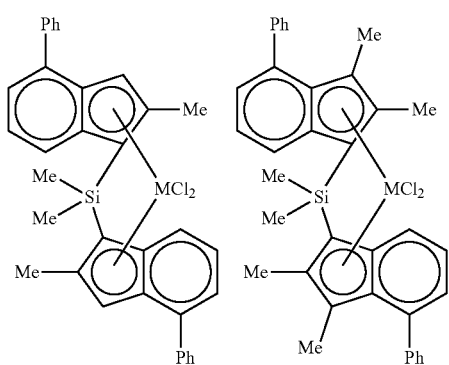
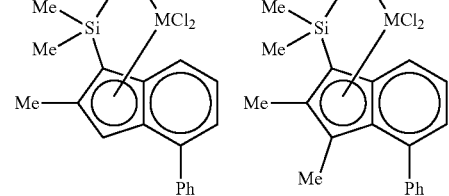
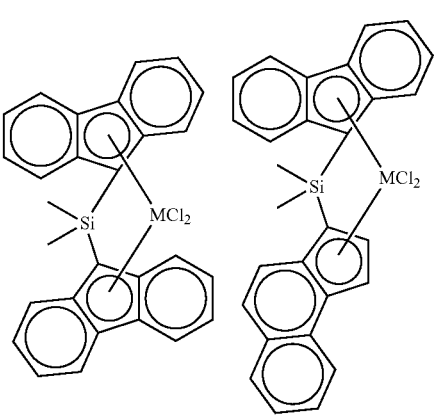
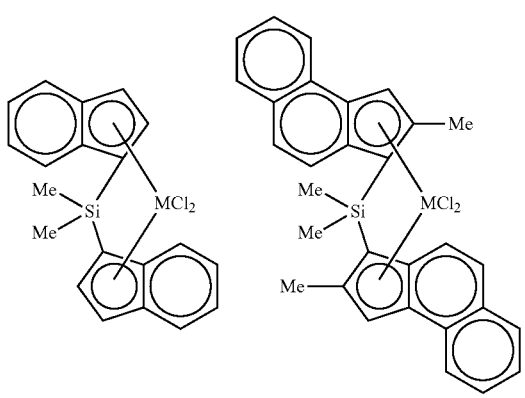
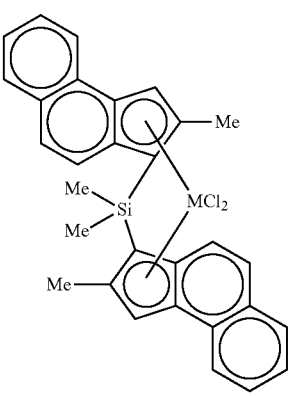

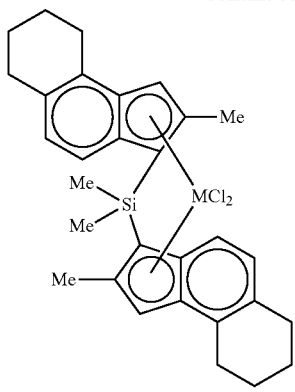
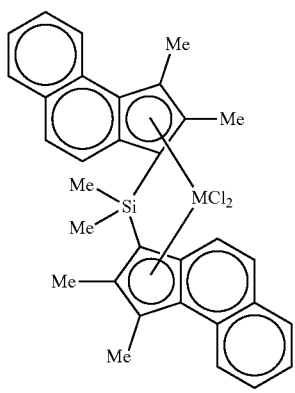
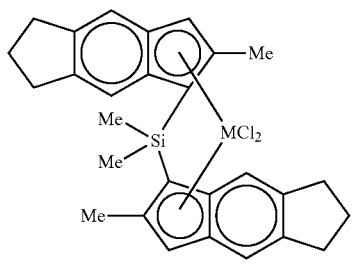
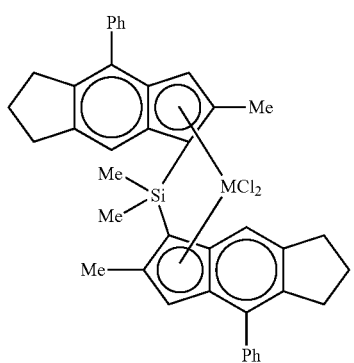
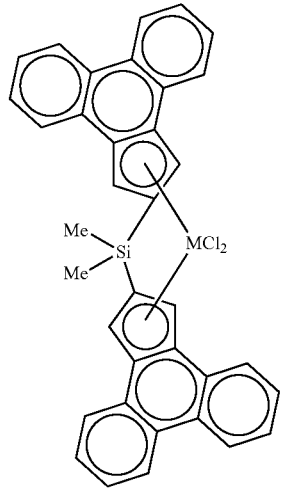
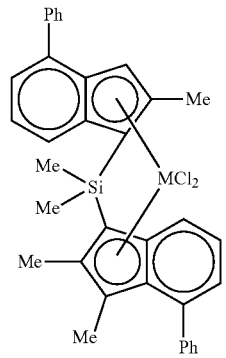
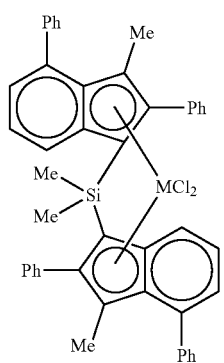
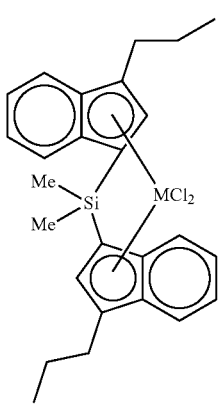
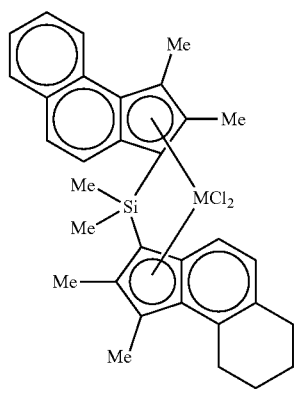
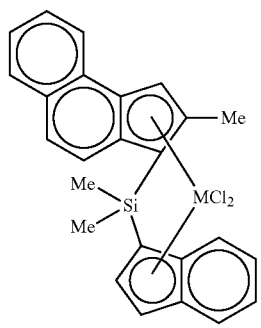

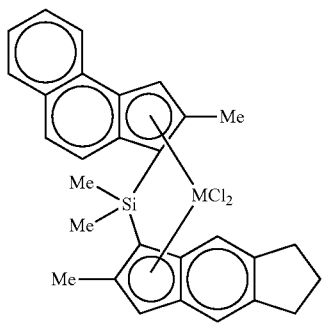

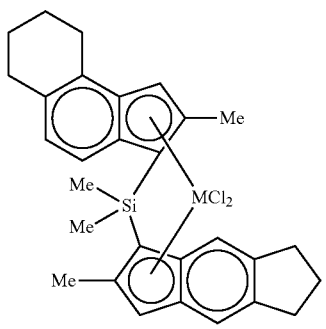

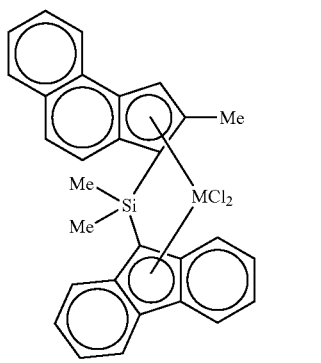

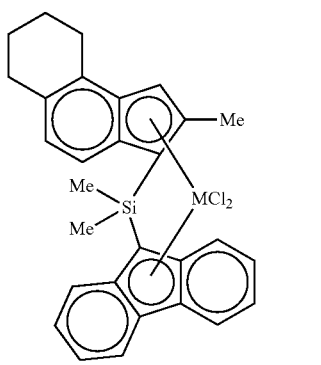

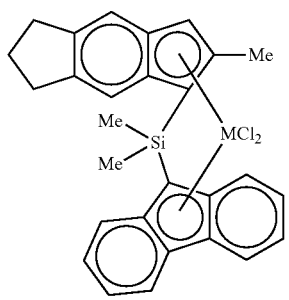

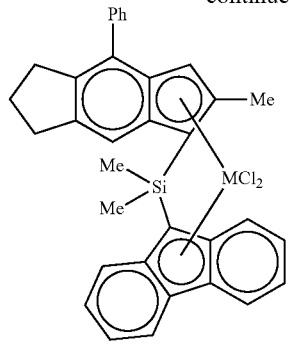

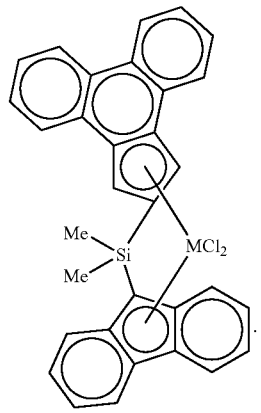

8. The high-density ethylene-based polymer of claim 5, wherein the cocatalyst compound is selected from Formulae 3 to 6:

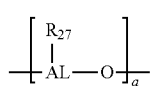

Formula 3 wherein, in Formula 3,
AL is aluminum,
$R_{27}$ is a halogen atom, a $C_1$-$C_{20}$ hydrocarbon group, or a $C_1$-$C_{20}$ hydrocarbon group substituted with halogen, and
a is an integer of 2 or more:

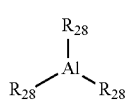

Formula 4 wherein, in Formula 4,
Al is aluminum or boron, and
$R_{28}$ is a halogen atom, a $C_1$-$C_{20}$ hydrocarbon group, a $C_1$-$C_{20}$ hydrocarbon group substituted with halogen, or a $C_1$-$C_{20}$ alkoxy, $$[L1\text{-}H]^+[Z1(A2)_4]^- \qquad \text{[Formula 5]}$$

$$[L2]^+[Z2(A3)_4]^- \qquad \text{[Formula 6]}$$

wherein, in Formulae 5 and 6,
L1 and L2 are neutral or cationic Lewis acids,
Z1 and Z2 are group 13 elements of the periodic table of the elements, and A2 and A3 are a substituted or unsubstituted $C_6$-$C_{20}$ aryl group or a substituted or unsubstituted $C_1$-$C_{20}$ alkyl group, wherein the substituted $C_6$-$C_{20}$ aryl group, and the substituted $C_1$-$C_{20}$ alkyl group are a $C_6$-$C_{20}$ aryl group, and a $C_1$-$C_{20}$ alkyl group where a hydrogen atom is substituted with a substituent comprising a halogen atom, a $C_1$-$C_{20}$ hydrocarbon group, a $C_1$-$C_{20}$ alkoxy group, and a $C_6$-$C_{20}$ aryloxy group, respectively.

9. The high-density ethylene-based polymer of claim 8, wherein the cocatalyst compound represented by Formula 3 is selected from the group consisting of methylaluminoxane, ethylaluminoxane, isobutylaluminoxane, and butylaluminoxane.

10. The high-density ethylene-based polymer of claim 8, wherein the cocatalyst compound represented by Formula 4 is selected from the group consisting of trimethylaluminum, triethylaluminum, triisobutylaluminum, tripropylaluminum, tributylaluminum, dimethylchloroaluminum, triisopropylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and tripentafluorophenylboron.

11. The high-density ethylene-based polymer of claim 8, wherein the cocatalyst compound represented by Formula 5 or 6 is selected from the group consisting of methyldioctadecylammonium tetrakis(pentafluorophenyl)borate, trimethylammonium tetrakis(phenyl)borate, triethylammonium tetrakis(phenyl)borate, tripropylammonium tetrakis(phenyl)borate, tributylammonium tetrakis(phenyl)borate, trimethylammonium tetrakis(p-tolyl)borate, tripropylammonium tetrakis(p-tolyl)borate, trimethylammonium tetrakis(o,p-dimethylphenyl)borate, triethylammonium tetrakis (o,p-dimethylphenyl)borate, trimethylammonium tetrakis(p-trifluoromethylphenyl)borate, tributylammonium tetrakis(p-trifluoromethylphenyl)borate, tributylammonium tetrakis (pentafluorophenyl)borate, diethylammonium tetrakis (pentafluorophenyl)borate, triphenylphosphonium tetrakis (phenyl)borate, trimethylphosphonium tetrakis(phenyl) borate, N,N-diethylanilinium tetrakis(phenyl)borate, N,N-dimethylanilinium tetrakis(pentafluorophenyl)borate, N,N-diethylanilinium tetrakis(pentafluorophenyl)borate, triphenylcarbonium tetrakis(p-trifluoromethylphenyl)borate, triphenylcarbenium tetrakis(pentafluorophenyl)borate, trimethylammonium tetrakis(phenyl)aluminate, triethylammonium tetrakis(phenyl)aluminate, tripropylammonium tetrakis(phenyl)aluminate, tributylammonium tetrakis(phenyl) aluminate, trimethylammonium tetrakis(p-tolyl)aluminate, tripropylammonium tetrakis(p-tolyl)aluminate, triethylammonium tetrakis(o,p-dimethylphenyl)aluminate, tributylammonium tetrakis(p-trifluoromethylphenyl)aluminate, trimethylammonium tetrakis(p-trifluoromethylphenyl) aluminate, tributylammonium tetrakis(pentafluorophenyl) aluminate, N,N-diethylanilinium tetrakis(phenyl)aluminate, N,N-diethylanilinium tetrakis(phenyl)aluminate, N,N-diethylanilinium tetrakis(pentafluorophenyl)aluminate, diethylammonium tetrakis(pentafluorophenyl)aluminate, triphenylphosphonium tetrakis(phenyl)aluminate, trimethylphosphonium tetrakis(phenyl)aluminate, triethylammonium tetrakis(phenyl)aluminate, and tributylammonium tetrakis(phenyl)aluminate.

12. The high-density ethylene-based polymer of claim 5, wherein a ratio of a total mass of a transition metal of the first metallocene compound and a transition metal of the second metallocene compound to a mass of the carrier is 1:1 to 1:1,000, and a mass ratio of the first metallocene compound to the second metallocene compound is 1:100 to 100:1.

13. The high-density ethylene-based polymer of claim 8, wherein a mass ratio of the cocatalyst compound represented by Formulae 3 and 4 to the carrier is 1:100 to 100:1, and a mass ratio of the cocatalyst compound represented by Formulae 5 and 6 to the carrier is 1:20 to 20:1.

14. The high-density ethylene-based polymer of claim 5, wherein the carrier comprises at least one selected from the group consisting of silica, alumina, titanium oxide, zeolite, zinc oxide, and starch, the carrier has an average particle size of 10 microns to 250 microns, the carrier has a microporous volume of 0.1 cc/g to 10 cc/g, and the carrier has a specific surface area of 1 $m^2$/g to 1,000 $m^2$/g.

15. A method for manufacturing a high-density ethylene-based polymer, comprising the steps of:

(a) preparing at least one first metallocene compound represented by Formula 1, at least one second metallocene compound represented by Formula 2, and at least one cocatalyst compound;

(b) stirring the prepared first metallocene compound, the prepared second metallocene compound, and the prepared cocatalyst compound at a temperature of 0° C. to 100° C. for 5 minutes to 24 hours to manufacture a catalyst mixture;

(c) adding the catalyst mixture to a reactor in which a carrier and a solvent are present, and stirring the mixture at a temperature of 0° C. to 100° C. for 3 minutes to 48 hours to manufacture a supported hybrid catalyst composition;

(d) adding the supported hybrid catalyst composition, at least one α-olefin monomer selected from the group consisting of α-olefins, and ethylene to an autoclave reactor or a gas phase polymerization reactor, and preparing the high-density ethylene-based polymer of claim 1 in an environment in which a temperature is 60° C. to 100° C. and a pressure is 10 bar to 20 bar,

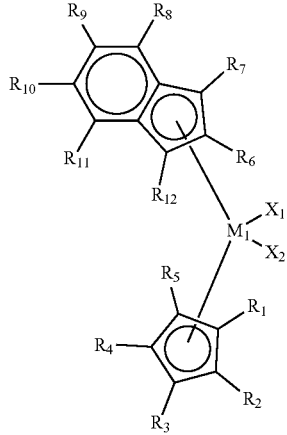

Formula 1 wherein, in Formula 1,

M1 is a group 4 transition metal of the periodic table of the elements, $X_1$ and $X_2$ are each independently one of halogen atoms,
$R_1$ to $R_{12}$ are each independently a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and are linked to each other to form a ring,
cyclopentadiene linked to $R_1$ to $R_5$ and indene linked to $R_6$ to $R_{12}$ have an asymmetric structure having different structures, and
the cyclopentadiene and the indene are not linked to each other to form a non-bridge structure:

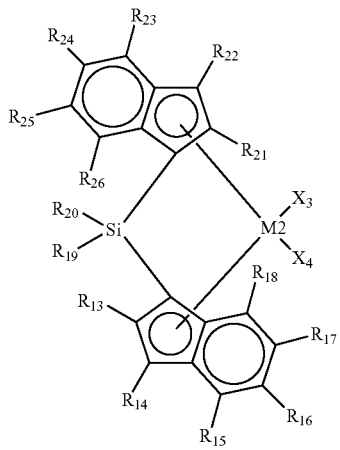

Formula 2 wherein, in Formula 2,
M2 is a group 4 transition metal of the periodic table of the elements,
$X_3$ and $X_4$ are each independently one of halogen atoms,
$R_{13}$ to $R_{18}$ are each independently a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and are linked to each other to form a ring,
$R_{21}$ to $R_{26}$ are each independently a hydrogen atom, a substituted or unsubstituted $C_1$-$C_{10}$ alkyl group, a substituted or unsubstituted $C_6$-$C_{20}$ aryl group, or a substrate or unsubstituted $C_7$-$C_{40}$ alkylaryl group and are linked to each other to form a ring,
$R_{19}$ and $R_{20}$ are each independently a substituted or unsubstituted $C_1$-$C_{20}$ alkyl group and are linked to each other to form a ring,
indene linked to $R_{13}$ to $R_{18}$ and indene linked to $R_{21}$ to $R_{26}$ have the same structure or different structures, and
the indene linked to $R_{13}$ to $R_{18}$ and the indene linked to $R_{21}$ to $R_{26}$ are linked to Si to form a bridge structure,
wherein the substituted $C_1$-$C_{10}$ alkyl group, the substituted $C_6$-$C_{20}$ aryl group, the substituted $C_7$-$C_{40}$ alkylaryl group, the substituted $C_1$-$C_{20}$ alkyl group are a C1-$C_{10}$ alkyl group, a $C_6$-$C_{20}$ aryl group, a $C_7$-$C_{40}$ alkylaryl group, and a $C_1$-$C_{20}$ alkyl group where a hydrogen atom is substituted with a substituent comprising a halogen atom, a $C_1$-$C_{20}$ hydrocarbon group, a $C_1$-$C_{20}$ alkoxy group, and a $C_6$-$C_{20}$ aryloxy group, respectively.

16. The method of claim 15, wherein the cocatalyst compound comprises compounds represented by Formulae 3 to 6:

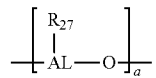

Formula 3 wherein, in Formula 3,
AL is aluminum,
$R_{27}$ is a halogen atom, a $C_1$-$C_{20}$ hydrocarbon group, or a $C_1$-$C_{20}$ hydrocarbon group substituted with halogen, and
a is an integer of 2 or more:

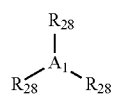

Formula 4 wherein, in Formula 4,
Al is aluminum or boron, and
$R_{28}$ is a halogen atom, a $C_1$-$C_{20}$ hydrocarbon group, a $C_1$-$C_{20}$ hydrocarbon group substituted with halogen, or a $C_1$-$C_{20}$ alkoxy group, $[L1\text{-}H]^+[Z1(A2)_4]^-$  [Formula 5]

$[L2]^+[Z2(A3)_4]^-$  [Formula 6]

wherein, in Formulae 5 and 6,
L1 and L2 are neutral or cationic Lewis acids,
Z1 and Z2 are group 13 elements of the periodic table of the elements, and
A2 and A3 are a substituted or unsubstituted $C_6$-$C_{20}$ aryl group or a substituted or unsubstituted $C_1$-$C_{20}$ alkyl group,
wherein the substituted $C_6$-$C_{20}$ aryl group, and the substituted $C_1$-$C_{20}$ alkyl group are a $C_6$-$C_{20}$ aryl group, and a $C_1$-$C_{20}$ alkyl group where a hydrogen atom is substituted with a substituent comprising a halogen atom, a $C_1$-$C_{20}$ hydrocarbon group, a $C_1$-$C_{20}$ alkoxy group, and a $C_6$-$C_{20}$ aryloxy group, respectively.

17. The method of claim 15, wherein the step (c) comprises:
precipitating the supported hybrid catalyst composition to separate a supernatant;
removing the separated supernatant and washing the remaining catalyst composition precipitate with a solvent; and
vacuum-drying the washed catalyst composition precipitate at a temperature of 20° C. to 200° C. for 1 hour to 48 hours.

18. The method of claim 15, wherein the α-olefin monomer is selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-aitosen.

* * * * *